United States Patent
Wilson et al.

(10) Patent No.: US 10,948,086 B2
(45) Date of Patent: Mar. 16, 2021

(54) CONCEALED THREE PORT FLUSHOMETER SYSTEM

(71) Applicant: SLOAN VALVE COMPANY, Franklin Park, IL (US)

(72) Inventors: John R. Wilson, Naperville, IL (US); John Beckman, Arlington Heights, IL (US); David Carpenter, Franklin Park, IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 16/271,690

(22) Filed: Feb. 8, 2019

(65) Prior Publication Data

US 2019/0170259 A1    Jun. 6, 2019

Related U.S. Application Data

(63) Continuation of application No. 15/492,985, filed on Apr. 20, 2017, now Pat. No. 10,215,288.

(51) Int. Cl.
| | |
|---|---|
| *F16K 1/12* | (2006.01) |
| *E03D 5/092* | (2006.01) |
| *E03D 5/10* | (2006.01) |
| *F16K 24/04* | (2006.01) |
| *F16K 31/06* | (2006.01) |

(52) U.S. Cl.
CPC ............. *F16K 1/123* (2013.01); *E03D 5/092* (2013.01); *E03D 5/10* (2013.01); *F16K 24/04* (2013.01); *F16K 31/0675* (2013.01); *Y10T 137/3331* (2015.04)

(58) Field of Classification Search
CPC ...... F16K 1/123; F16K 24/04; F16K 31/0675; E03D 5/092; Y10T 137/3331
See application file for complete search history.

(56) References Cited

U.S. PATENT DOCUMENTS

| 1,498,226 | A | ‡ | 6/1924 | Beck | E03D 3/04 |
| | | | | | 137/53 |
| 1,511,009 | A | * | 10/1924 | Spear | E03D 3/04 |
| | | | | | 251/36 |
| 1,518,942 | A | * | 12/1924 | Spear | E03D 3/04 |
| | | | | | 251/30.04 |
| 1,535,562 | A | * | 4/1925 | Atkins | E03D 3/04 |
| | | | | | 251/28 |
| 1,942,837 | A | ‡ | 1/1934 | Schultheiss | E03D 3/04 |
| | | | | | 251/34 |

(Continued)

OTHER PUBLICATIONS

International Search Report and Written Opinion in PCT/US2017/028747, dated Sep. 27, 2017, 11 pages.‡

(Continued)

*Primary Examiner* — Kevin R Barss
(74) *Attorney, Agent, or Firm* — Banner & Witcoff, Ltd.

(57) ABSTRACT

A flushometer system having an integrated control stop and three ports. The piston or flush control device is accessible through an actuation opening. The flushometer system may be utilized in a behind-the-wall installation with a face plate exterior for user interaction. The interior of the flushometer may be accessed through the actuation opening behind the face plate.

20 Claims, 20 Drawing Sheets

(56) References Cited

U.S. PATENT DOCUMENTS

| | | | | | |
|---|---|---|---|---|---|
| 3,008,683 | A | ‡ | 11/1961 | Filliung | E03D 3/04 137/36 |
| 3,695,288 | A | ‡ | 10/1972 | Billeter | E03D 5/024 137/36 |
| 4,110,850 | A | ‡ | 9/1978 | Tedei | E03D 1/145 4/326 |
| 5,497,802 | A | ‡ | 3/1996 | Whiteside | E03D 3/04 137/32 |
| 5,584,313 | A | * | 12/1996 | Britt | E03C 1/104 137/107 |
| 5,881,993 | A | ‡ | 3/1999 | Wilson | E03D 3/04 138/45 |
| 8,037,551 | B2 | * | 10/2011 | Wilson | E03D 3/02 251/129.04 |
| 8,070,128 | B2 | * | 12/2011 | Snyder | E03D 3/02 251/129.03 |
| 8,234,724 | B2 | * | 8/2012 | Wilson | E03D 3/12 4/302 |
| 8,365,320 | B1 | ‡ | 2/2013 | Lordahl | E03D 1/34 4/378 |
| 8,585,008 | B2 | * | 11/2013 | Wilson | E03D 3/12 251/42 |
| 9,169,626 | B2 | * | 10/2015 | Guler | E03D 3/06 |
| 9,353,511 | B2 | * | 5/2016 | Wilson | E03D 3/12 |
| 2004/0025238 | A1 | ‡ | 2/2004 | Parsons | E03D 1/142 4/378 |
| 2005/0087709 | A1 | ‡ | 4/2005 | Nortier | E03D 3/04 251/40 |
| 2014/0053922 | A1 | ‡ | 2/2014 | Wilson | E03D 3/04 137/48 |
| 2014/0259343 | A1 | * | 9/2014 | Wilson | E03D 3/12 4/249 |

OTHER PUBLICATIONS

Office Action for U.S. Appl. No. 15/492,985, dated Jul. 5, 2018, 7 pages.

\* cited by examiner
‡ imported from a related application

CONCEALED THREE PORT FLUSHOMETER SYSTEM

CROSS-REFERENCE TO RELATED APPLICATIONS

This application is a continuation of U.S. patent application Ser. No. 15/492,985 filed Apr. 20, 2017, the entire content of which is hereby incorporated by reference.

TECHNICAL FIELD

The present disclosure relates generally to systems for flushometers, more specifically for flushometers disposed behind a wall (in-wall) with an exposed actuation mechanism.

BACKGROUND

Flushometers are a ubiquitous presence in most commercial restrooms, as well as in many homes. Flushometers typically utilize a familiar valve body having an inlet, an outlet, a handle opening, and a removable cap for accessing the valve. Thus, most flushometer valve bodies rely upon a four-port arrangement. Further, most such flushometers utilize a control stop associated with the valve body and positioned immediately upstream of the water supply, allowing the valve to be isolated from the water supply line by closing the control stop.

In-wall flushometers are known, but present a problem of access for maintenance and replacement. The four-port design requires a much larger freedom of access and working space than is typically available for in-wall or behind-wall installations. Further, the use of a control stop requires both a larger volume of area that must be accessed and further increases the mass of material that must be placed behind or in the wall.

In addition, flushometers in the art typically were designed for an environment where water conservation was not a consideration. Thus, a typical flushometer is not concerned with performance in a low flush volume environment, resulting in poor or undesirable performance of typical flush valves when put into service in a low flush volume environment. However, lower flush volumes exacerbate certain aspects of a flushometer's performance, such as a tendency to exhibit a harmful shock to the system upon opening and upon closing due to the abrupt change in flow. Further, the design of flushometer valves is such that if the valve fails, i.e. remains open, the valve is at its highest flow rate. This results in both a large amount of wasted water as well as an increased potential for an overflow from the associated toilet or urinal which may not be able to drain such a high flow rate when provided continuously.

Thus, there is a need for flushometers that provide for improved access in behind-the-wall or concealed applications.

SUMMARY

Embodiments described herein relate generally to a flushometer system. The flushometer system has a valve body having an inlet, an outlet, and an actuation opening. A valve seat assembly is disposed in the valve body between the inlet and the outlet. A sleeve is adjustably engageable with the valve body, the sleeve movable relative to the valve body to be engaged and disengaged from the valve seat assembly. A piston valve assembly is disposed within the sleeve and configured to engage the valve seat assembly to close the flushometer system. An actuation module is engaged with the sleeve and has a relief valve, the actuation module secured at the actuation opening with a locking mechanism. A flow control extends from the piston assembly, the flow control comprising a snubber portion, a flush profile portion, and a plug portion.

Another embodiment relates to a concealed flushometer system. The system comprises a valve body having an inlet, an outlet, and an actuation opening. A valve seat assembly is disposed in the valve body between the inlet and the outlet. A sleeve is adjustably engageable with the valve body, the sleeve movable relative to the valve body to be engaged and disengaged from the valve seat assembly. A piston valve assembly is disposable within the sleeve and configured to engage the valve seat assembly to close the flushometer system. An actuation module is engageable with the sleeve and having a relief valve, the actuation module secured at the actuation opening with a locking mechanism. A face plate assembly has a face plate push button and a mounting ring, the mounting ring configured to engage a structure behind which the valve body is positioned. The mounting ring further includes mounting ring opening through which a face plate is engageable with the relief valve;

Yet another embodiment relates to a flushometer system comprising a valve body having an inlet, an outlet, and an actuation opening. A valve seat assembly is disposed in the valve body between the inlet and the outlet. A sleeve is adjustably engageable with the valve body, the sleeve movable relative to the valve body to be engaged and disengaged from the valve seat assembly. An actuation module is engageable with the sleeve, the actuation module secured at the actuation opening with a locking mechanism. A flow control is disposable within the sleeve and configured to engage the valve seat assembly to close the flushometer system, the flow control in communication and controlled by the actuation module. The locking mechanism is engageable with a shoulder disposed adjacent the actuation opening, the locking mechanism at least partially captured between the shoulder of the valve body and the actuation module when the sleeve is spaced apart from the valve seat assembly and the locking mechanism being disengaged from the actuation module when the sleeve is engaged with the valve seat assembly.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
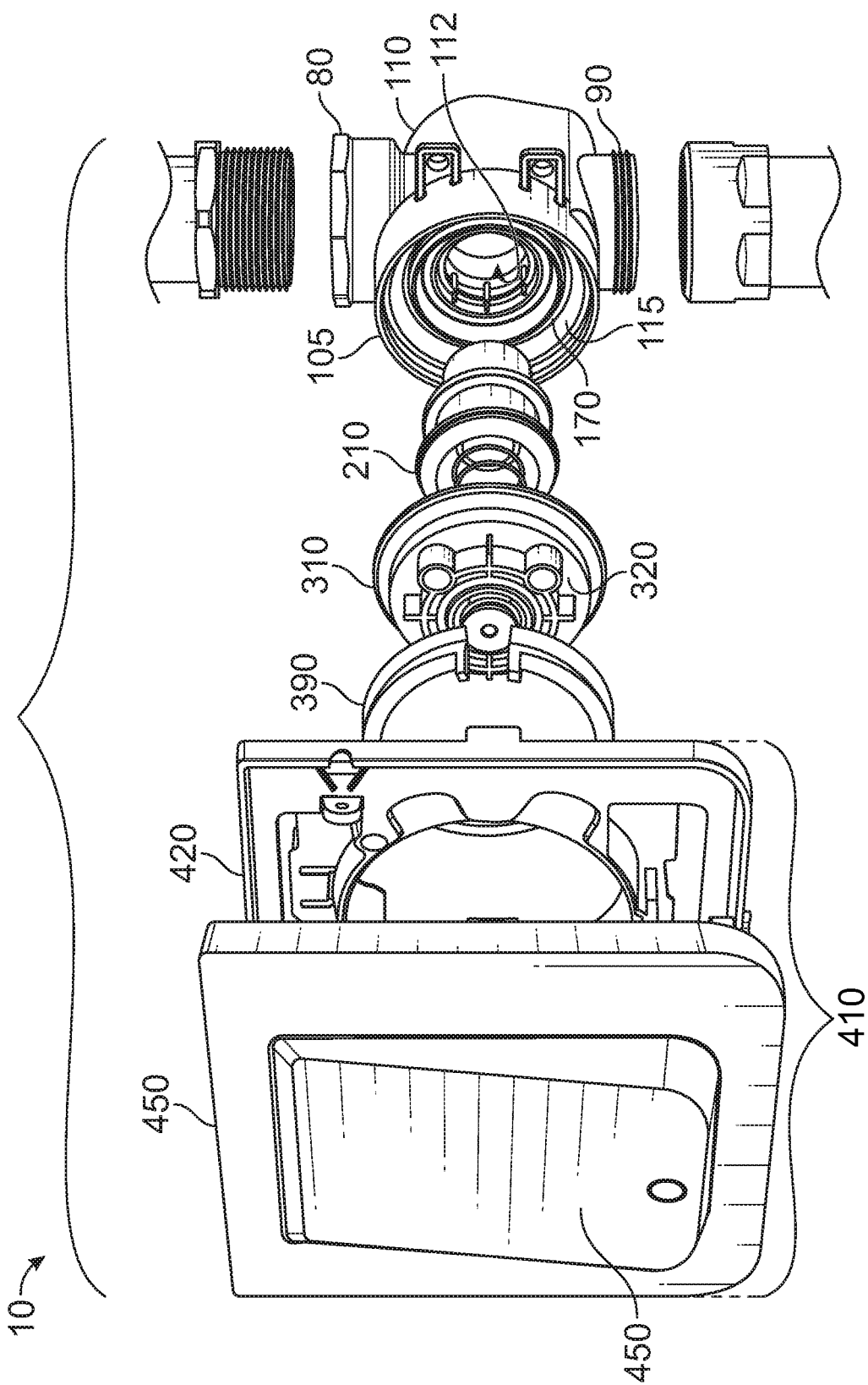
FIG. 1 is an exploded perspective view of one embodiment of a flushometer system.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to a flushometer system and methods for same.

In one embodiment, the flushometer system 10 includes a valve body 110. FIG. 1 generally illustrates the structure of one embodiment of a flushometer system 10. As seen in FIG. 1, the valve body 110 includes an inlet 80 and an outlet 90. The inlet 80 maybe be positioned at a top of the valve body 110 and the outlet 90 positioned at the bottom. An actuation opening 105 may be positioned substantially perpendicular to an axis running through the inlet 80 and outlet 90. It should be appreciated the positioning of the inlet 80, outlet 90, and actuation opening 105 relative to space (i.e. which is up/down/etc.) can be changed and the described relative orientations maintained as described. In the embodiments illustrated in the Figures, the inlet 80 and the outlet 90 are parallel, essentially providing fluid at a top of the valve and evacuating fluid at the bottom. The actuation opening 105 is positioned perpendicular to the inlet 80 and outlet 90. However, in alternative embodiments the inlet 80 may be positioned on alternative "faces" of the valve, for example positioned for a side-entry, perpendicular to both the actuation opening 105 and the outlet 90.

Disposed between the inlet 80 and the outlet 90, as well as adjacent the actuation opening 105 is a valve chamber 112, in which a piston assembly 210 and main valve seat 152 are positioned and which is defined by the space between the piston assembly 210, the inlet and the outlet 90, and through which water flows during a flush. The valve chamber 112 is open to the inlet 80 through the inlet aperture 81 (which may be sealed by the sleeve acting as a control stop through engagement of the main valve seat assembly 150 by the sleeve 170 as described below) and open to the outlet 90 through the valve chamber outlet 91 (best seen in FIG. 5B) (controlled by the main valve seat assembly 150 as described below) and also open to the actuation opening 105 (sealed by the actuation module 310 and piston assembly 210 as described below). Thus, water flows through the valve chamber 112 controlled or sealed at each opening by structure as indicated below.

Figure 2A:
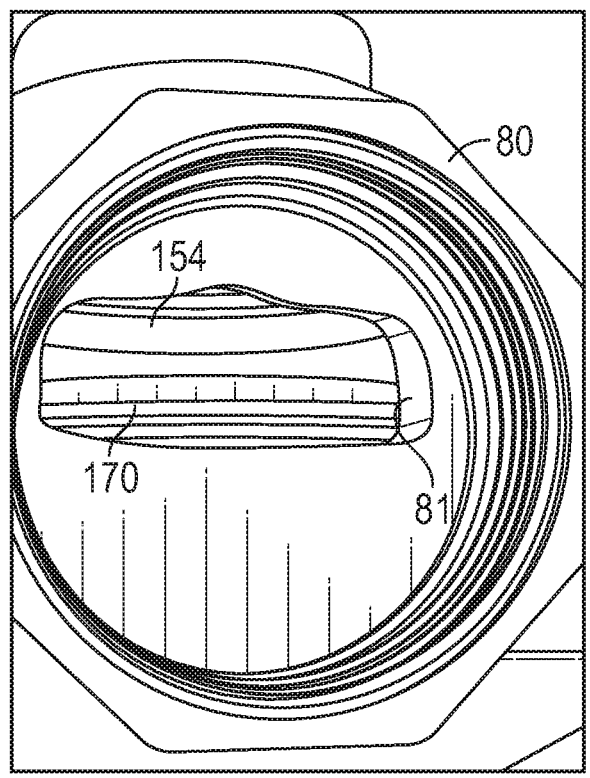
FIG. 2A is a view of one embodiment a flushometer from the inlet with a sleeve serving as a stop (control stop) in the open position.
Figure 2B:
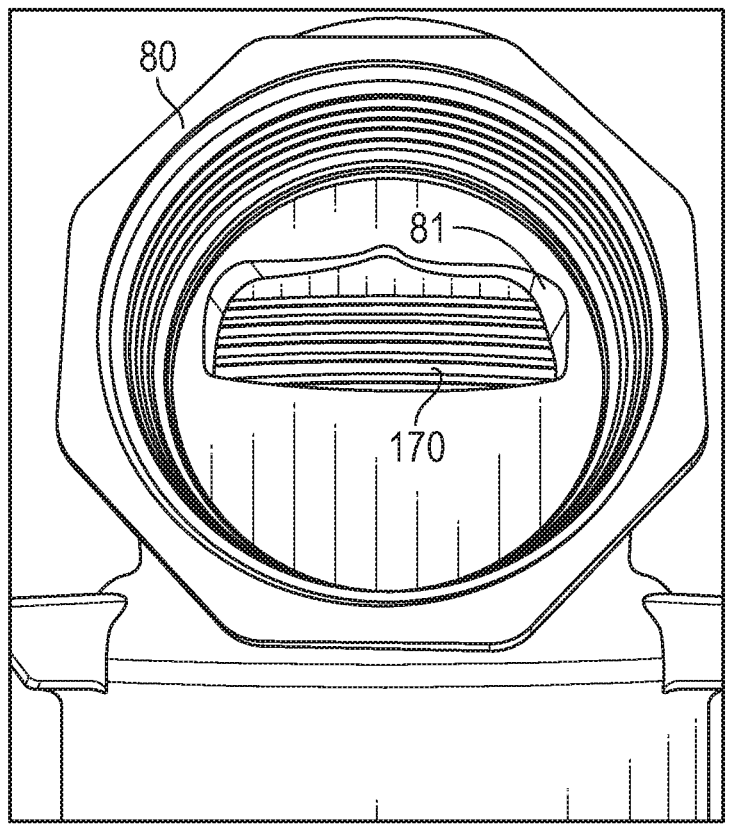
FIG. 2B shows the control stop of FIG. 2A in the closed position, i.e. with the sleeve contacting a main valve seat.

In one embodiment, best shown in FIGS. 2A and 2B, the inlet 80 includes an inlet aperture 81. The inlet aperture 81 may have a smaller area than the inlet 80. Further, the inlet aperture 81 may have a selected shape, such as a rectangle with curved corners. The inlet aperture 81 serves to restrict the flow of water into the valve chamber 112. In one embodiment, the inlet aperture 81 allows water to flow to the piston assembly 210 with a minimum number of turns in its flow path from the inlet 81. In addition, the inlet aperture 81 may interact with the sleeve 170 as described below.

The valve chamber 112 includes a valve seat receptacle 114. The valve seat receptacle 114 may comprise a threaded portion of the valve body 110 within the valve chamber 112 or may include a physical structure to allow for a main valve seat assembly 150 to be retained, such as by snap-fit, twist-and-lock, or the like. In one embodiment, the valve seat receptacle 114 is adjacent the valve chamber outlet 91 (best illustrated in FIGS. 5B and 5D). Preferably, the valve seat receptacle 114 and main valve seat assembly 150 are sized to position a main valve seat 152 of the main valve seat assembly 150 adjacent the inlet aperture 81, such as best seen in FIG. 5B (interior view) and FIG. 3A (exterior view).

Figure 3A:
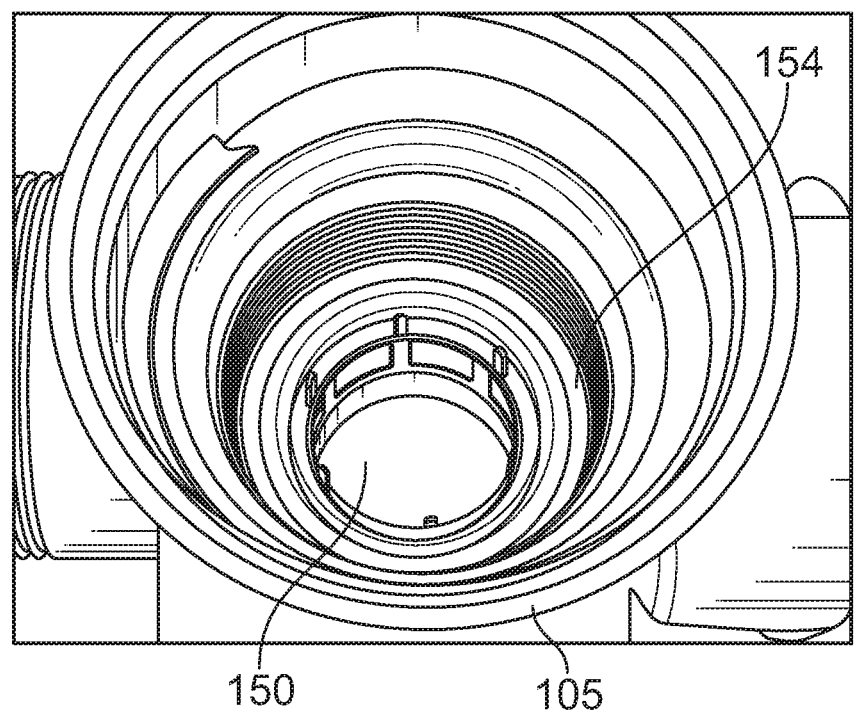
FIG. 3A illustrates one embodiment of a flushometer with a main valve seat assembly positioned in the valve body, as viewed in perspective through the actuation opening from the side.
Figure 3B:
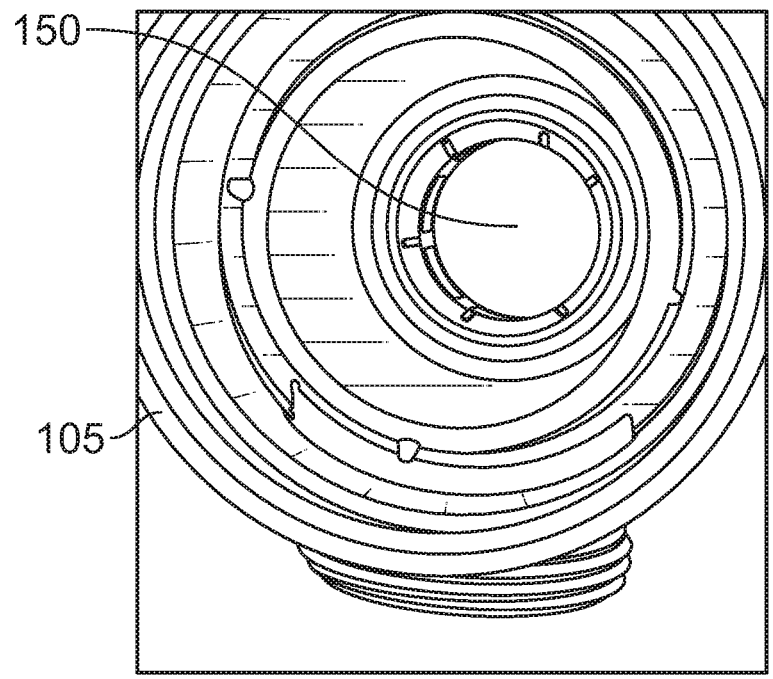
FIG. 3B illustrates one embodiment of a flushometer with a main valve seat assembly positioned in the valve body, as viewed in perspective through the actuation opening from the outlet.
Figure 4A:
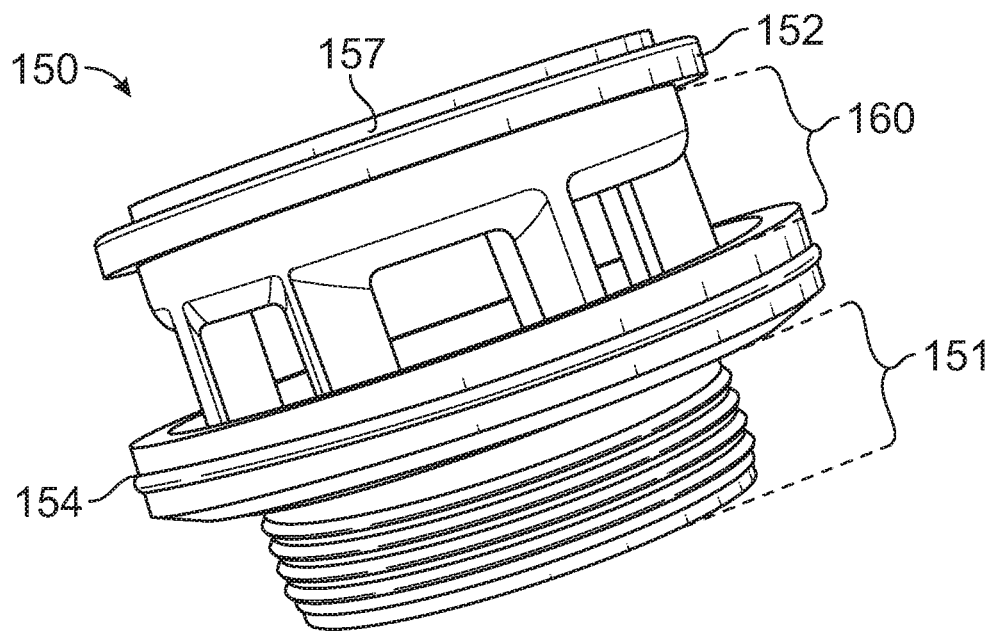
FIG. 4A illustrates a side view of one embodiment of a main valve seat assembly.
Figure 4B:
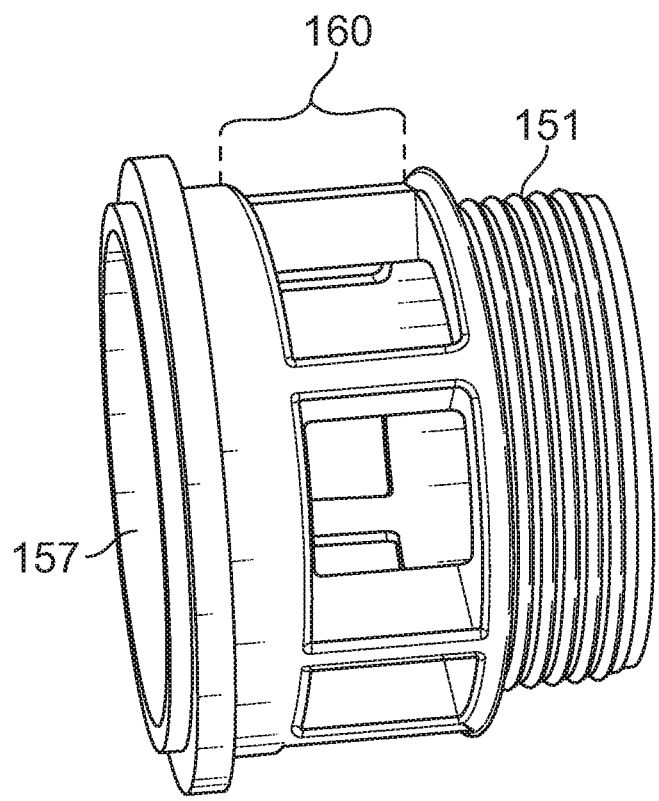
FIG. 4B illustrates a perspective view of one embodiment of a main valve seat assembly.

FIGS. 4A and 4B show one embodiment of a main valve seat assembly 150 outside of the valve body 110. The main valve seat assembly 150 includes a retention mechanism 151, a main valve seat 152, a main valve seat inlet 157 and one or more main valve outlets 160. In one embodiment, as shown in FIG. 4A, a main valve seat assembly control stop seal 154 is provided. The control stop seal 154 engages the valve body as shown in FIG. 2A. The control stop seal 154 is engageable with the sleeve 170 to function as a control stop, sealing water from entering the valve chamber 112. In the illustrated embodiment, the main valve seat assembly 150 is substantially circular in cross-section, forming a generally cylindrical shape with an outer wall and both faces of the cylinder being openings. The main valve seat 152 circumscribes the main valve seat inlet 157, which opens into the interior of the main valve seat assembly 150, which is essentially defined by a housing or structure about the periphery. The main valve seat assembly 150 of the FIG. 4A includes a threaded portion as the valve seat receptacle 114 which extends into a machined and threaded portion of the valve chamber 112 opposite of the actuation opening 105. Thus, as seen in FIG. 3A, the main valve seat assembly 150 may be threaded into the valve seat receptacle 114 of the valve body. The one or more main valve outlets 160 are voids, windows, openings, or the like, in the housing of the main valve seat assembly 150. The one or more main valve outlets 160 provide for communication from within the main valve seat assembly 150 and the outlet 90. Thus, water can flow through the main valve seat inlet 157 through the interior of the main valve seat assembly 150 and through the one or more main valve outlets 160.

When the main valve seat assembly 150 is positioned in the valve body 110, any fluid that would flow through the flushometer 10, must flow through the inlet aperture 81, over the main valve seat 152, through the main valve seat inlet 157 and then out the one or more main valve outlets 160. The one or more main valve outlets 160 open to the outlet 90 through the valve chamber outlet 91.

In some embodiments, a sleeve receptacle 116 of the valve body 110 is configured to receive a sleeve 170. The sleeve 170 may be a cylindrical (or similar) structure defining a hollow interior and open at both faces of the cylindrical shape. The sleeve receptacle 116 may comprise a threaded portion of the valve body 110 within the valve chamber 112 or may include a physical structure to allow for the sleeve 170 to be retained, such as by snap-fit, twist-and-lock, or the like. The sleeve 170 interacts with the piston assembly 210 and the actuation module 310 as further described below to define the relief chamber 201.

In addition, the sleeve 170 also provides a shut-off mechanism or "control stop" valve. Thus, the control stop is integrated with the valve itself rather than positioned as a separate structure on the water line as is typical. As best seen in FIG. 5, the sleeve 170 has a sleeve valve seat end which is positioned nearest to the main valve seat 152 and the inlet aperture 81 and an opposite bonnet end that engages with the bonnet 320 of the actuation module 310 as described below. As best shown in FIGS. 2A and 2B, the sleeve 170 may be adjustable relative to the control stop seal 154 of the main valve seat assembly 150 and/or the inlet aperture 81. The sleeve 170 may, thus, be repositioned to adjust the relative position of the sleeve 170 and the inlet aperture 81 and main valve seat 152. The sleeve 170 can extend towards the main valve seat 152, covering a portion or the entire inlet aperture 81. When the sleeve 170 is advanced towards the main valve seat 152 to contact the main valve seat 152, the main valve inlet 157 is effectively sealed off from the inlet aperture 81, thus closing the flushometer 10 from supply water. FIGS. 2A and 2B show the sleeve 170 in various positions as seen through the inlet aperture 81.

In one embodiment, the sleeve 170 in conjunction with the control stop seal 154, is an adjustable throttling mechanism. That is, the space between the sleeve 170 and the control stop seal 154 can be adjusted as desired to restrict flow, allowing for adjustment to the GPM of water passing through the inlet 80 and through the main valve assembly outlets 160.

Figure 5A:
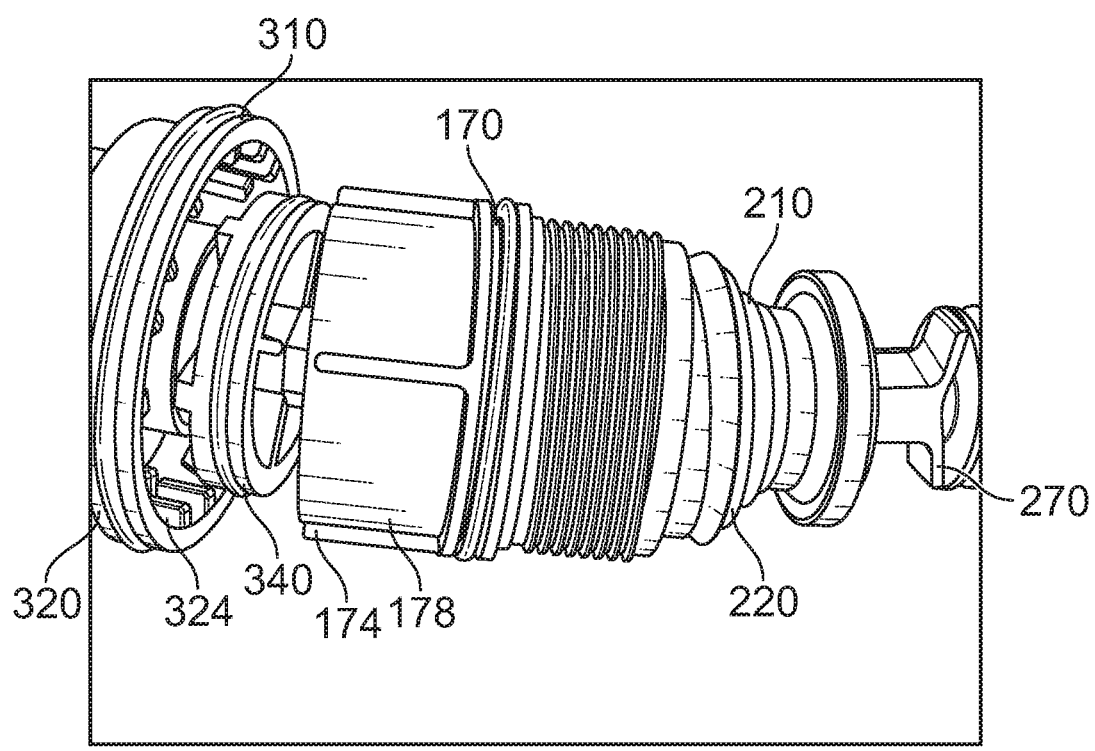
FIG. 5A illustrates one embodiment of an actuation module, piston assembly, and sleeve.
Figure 5B:
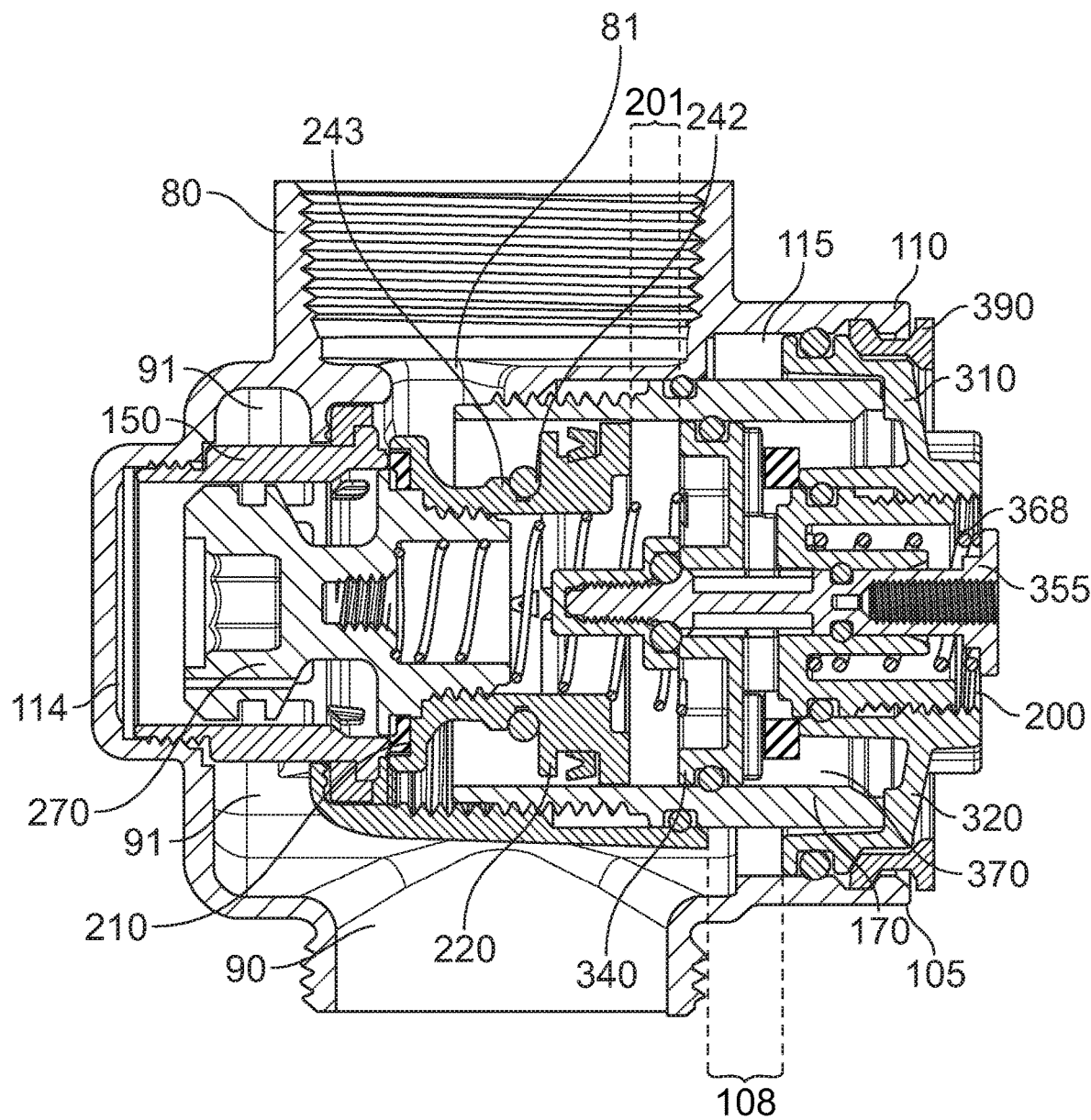
FIG. 5B illustrates a partial cross-section of one embodiment of a flushometer highlighting the actuation module 310 and piston 220 positioning when assembled.
Figure 5C:
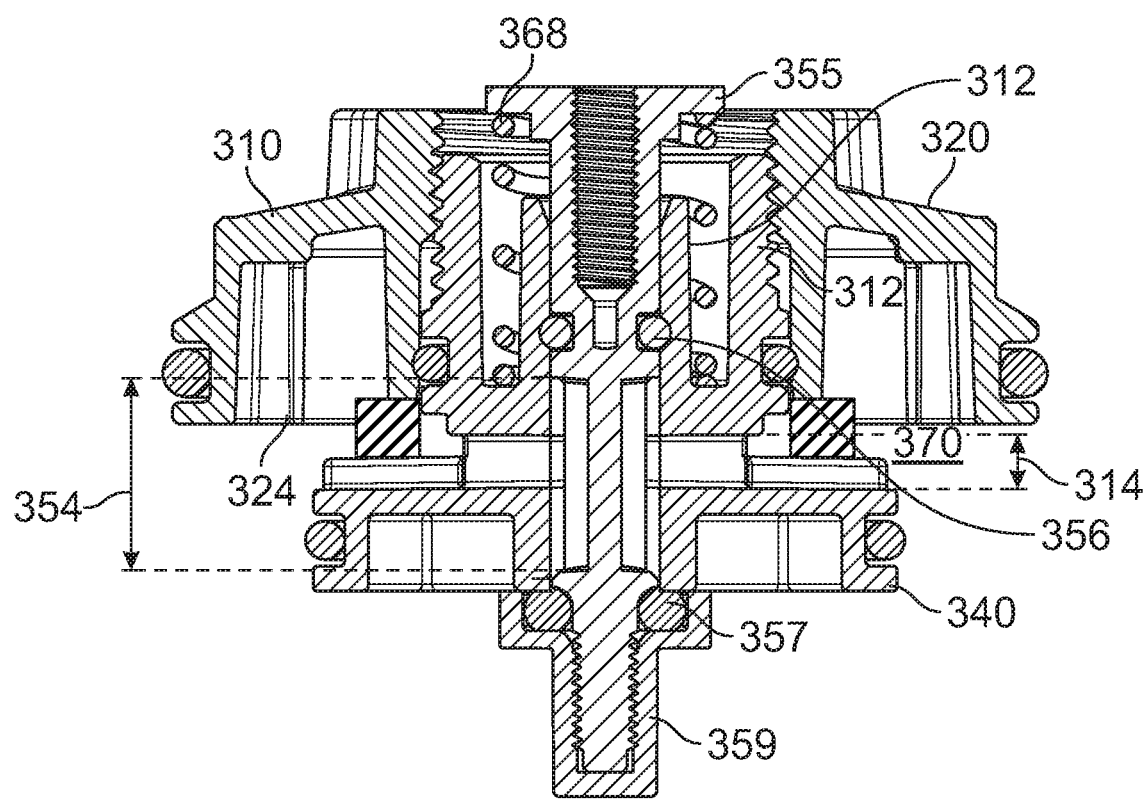
FIG. 5C is an isolated cross-section of the actuation module 310.
Figure 5D:
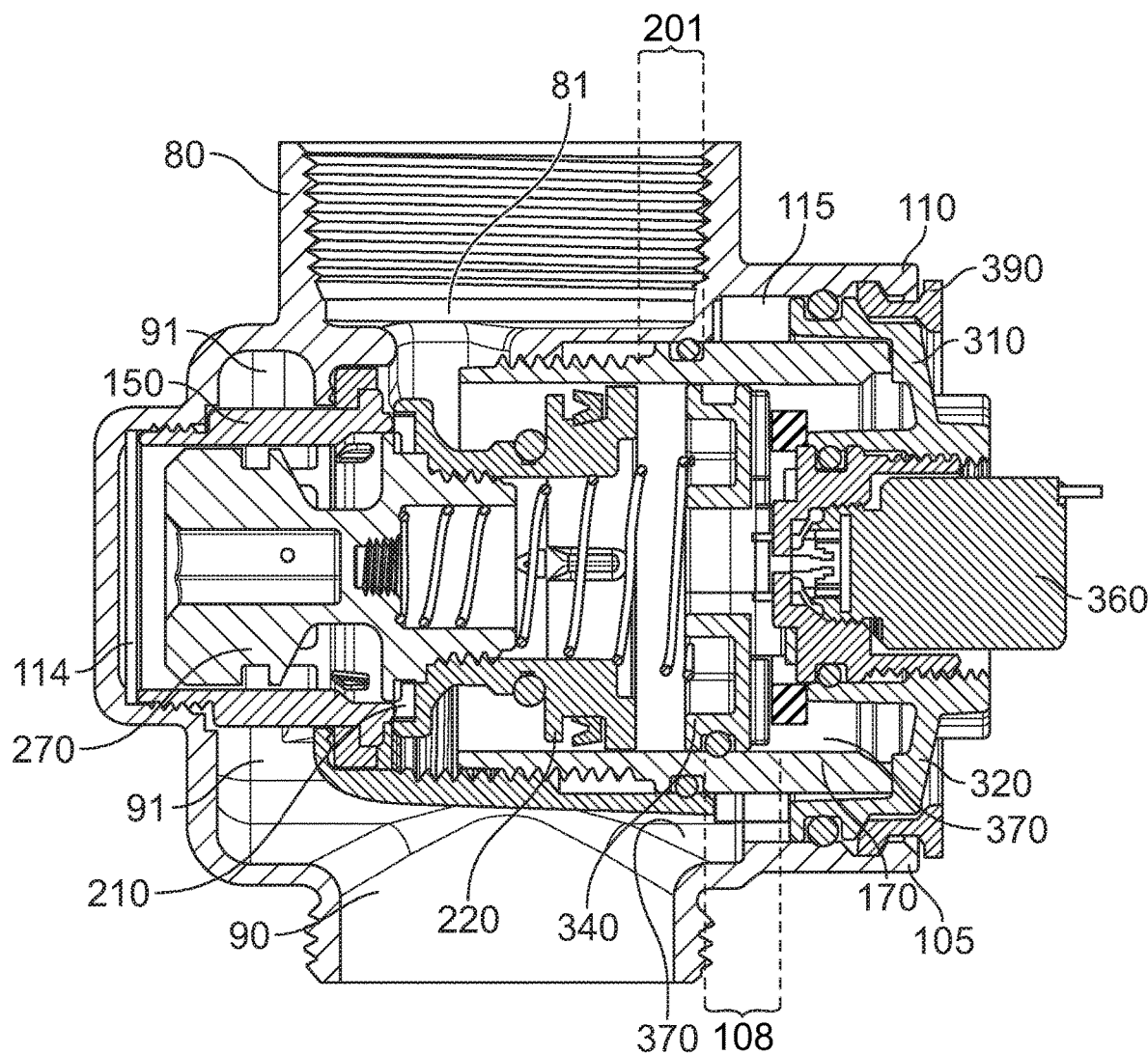
FIG. 5D illustrates a partial cross-section of one embodiment of a flushometer highlighting the actuation module 310 and piston 220 positioning when assembled for a device with an automatic actuation mechanism.
Figure 5E:
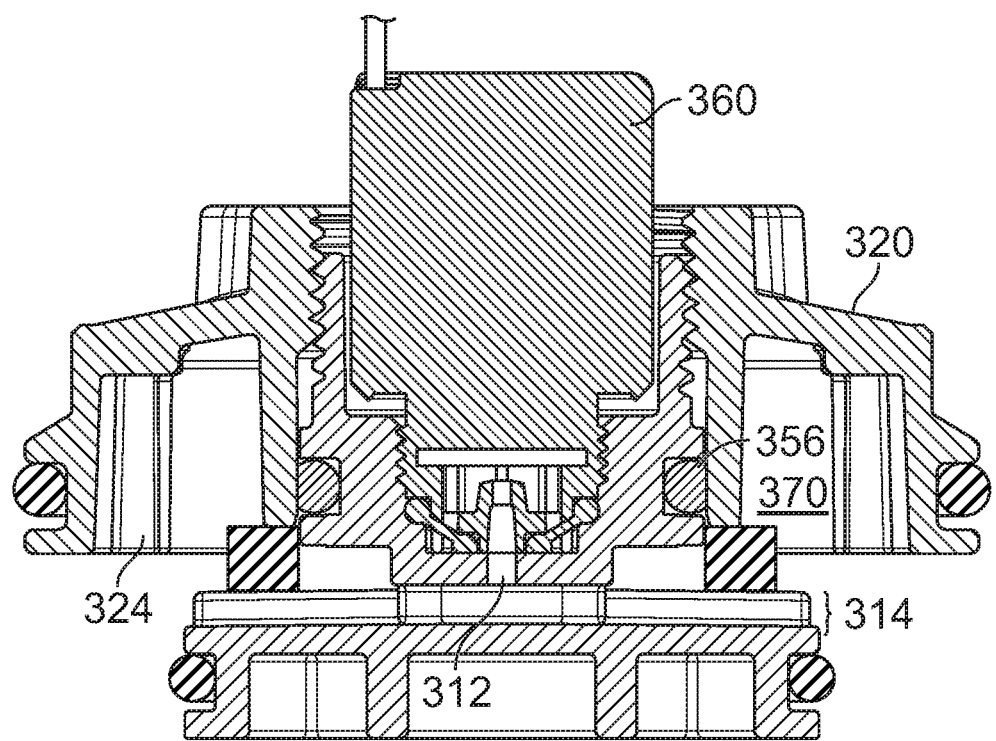
FIG. 5E is an isolated cross-section of the automatic actuation mechanism of FIG. 5D
Figure 6A:
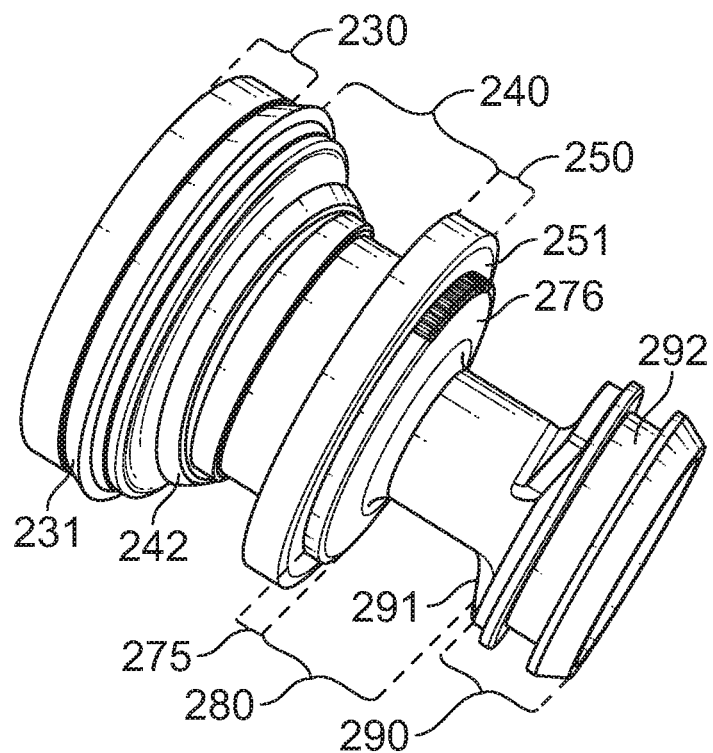
FIG. 6A illustrates a side view of one embodiment of a piston assembly.
Figure 6B:
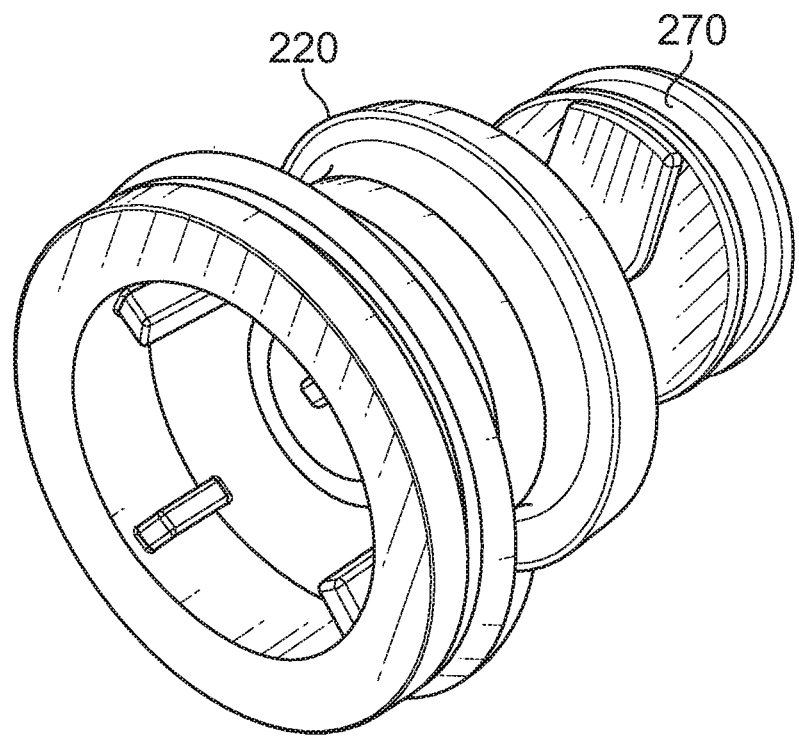
FIG. 6B illustrates a perspective view of one embodiment of a piston assembly.
Figure 6C:
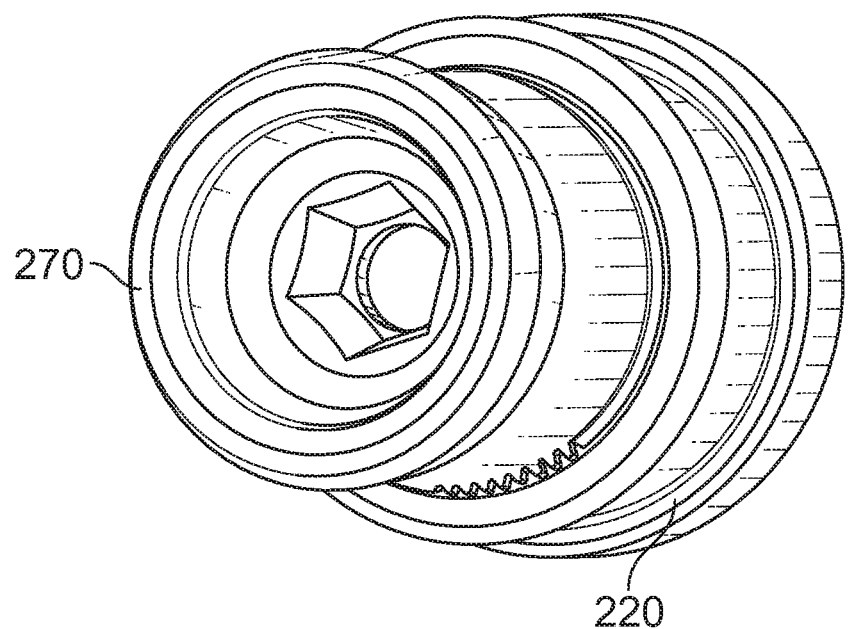
FIG. 6C illustrates a view from the flow control end of an embodiment of a piston assembly.

In one embodiment, engaging with the main valve seat assembly 150 is a piston assembly 210, shown in FIG. 5 engaging the sleeve 170 and shown separately in FIGS. 6A-6C. The piston assembly 210 is positioned within the valve body 110 through the actuation opening 105. The piston assembly 210 is disposable within the interior of the sleeve 170 and engageable with the valve seat assembly 150. One embodiment of the piston assembly 210 includes a piston 220 and a flow control 270.

As seen in FIGS. 5A, 5B, and 5D, the piston 220, of the piston assembly 210, is disposable within the sleeve 170. The piston 220 has a hollow body with a largest diameter at a top lip seal portion 230 (activation side), a relief potion 240 having a reduced diameter and positioned in the middle of the piston assembly 210, and a main valve seal portion 250 which, in the illustrated embodiment, both engages the flow control 270 and is engageable with the main valve seat assembly 150 to close the flushometer 10.

With regard to FIG. 6A-6C, the top lip seal portion 230 of the piston 220 provides a seal 231 between the piston 220 and the sleeve 170. This seal 231 separates the relief chamber 201, i.e., the environment defined by the interior of the piston and between the piston 220 and the actuation module 310 from the valve chamber 112, i.e. the environment within the sleeve 170 (between the sleeve 170 and the piston 220) which extends through to the main valve seat assembly and, to be in communication with the inlet 80 and, when the valve is open, the outlet 90. As would be understood from similar function in prior piston valves, the lip seal 231 also serves to maintain the position of the piston assembly 210 relative to the sleeve 170.

With continued reference to FIGS. 6A-6C, the relief portion 240 of the piston 220 includes one or more by-pass openings (not shown). The by-pass openings (not shown) allow fluid to pass from the environment outside of the piston 220 (within the relief chamber 201) to within the piston 220. The by-pass openings (not shown) may utilize technology as known in the art for piston valves, such as including a filter 242. The filter 242 may be positioned in a corresponding groove 243, such as a circumferential groove 243 (best shown in FIG. 5b). The by-pass openings may be a group of slots or holes within the groove 243 where the filter 242 is positioned within the groove 243 and functions to prevent the clogging of the by-pass openings, such as by debris in water from the inlet 80. Preferably there are at least two by-pass openings equally spaced about the relief portion 240.

The main valve seal portion 250 of the piston 220 includes a seal surface 251 for engaging and sealing the valve against the main valve seat 152. The seal surface 251 seats upon the valve seat 152 when the flushometer 10 is closed. The flow control 270, attaches to the piston 220, such as at the main valve seal portion 250.

The flow control 270, of the piston assembly 210 is configured to control and define the flush profile. In the embodiments shown, the flow control 270 includes a "dumbbell" shape, with a larger (relative to the flush profile portion 280) circumference snubber portion 275, a smaller circumference flush profile portion 280 and a larger (relative to the flush profile portion 280) plug portion 290. The flow control 270 may be profiled, such as with rounded edges at the downstream portion to provide for water flow efficiency.

The snubber portion 275 is sized so as to have a smaller outer diameter than the main valve seal portion 250 and smaller than the inner diameter of the main valve seat 152. Thus, the snubber portion 275 is able to be disposed within the main valve seat assembly 150, such as when the main valve seal 251 is engaged with the main valve seat 152. The height of the snubber portion 275, that is the distance it extends from the main valve seal portion 250 before transitioning to the flush profile portion 280, may be selected to control the behavior of the flushometer 10 at closing. For example, the presence of the snubber portion 275 at the end of a flush cycle reduces the volume of water initially passed through the flushometer 10 and also slows the seating of the main valve seal 251 on the main valve seat 152 as the snubber portion 275 enters the main valve seat assembly 150. This lessens the impact of the flush cycle on the system by more gradually presenting the water flow through the valve rather than immediately moving to a maximum flow rate. Further, the snubber portion 275 may be provided with hydraulic features 276 about at least a portion of its periphery, such as refill flow grooves. Such hydraulic features 276 may be used to control the performance just prior to and at the moment of valve closing.

The outer diameter of the plug portion 290 is preferable smaller than the outer diameter of the snubber 275, so as to avoid the valve running at "full open" in the event the valve fails to close. Thus, if the flow control 270 becomes detached, the device will "fail" with the snubber engaging the main valve seat 152. It will be appreciated this will result in substantially lower volume of water per minute passing through the valve than if the valve failed into a fully open status.

The flush profile portion 280 extends from the snubber portion 275. The outer diameter of the flush profile portion 280 is less than that of the snubber portion 275, for example having less than ¾, ½ or ¼ diameter of the snubber portion 275 and/or the plug portion 290. In one embodiment the difference in outer diameter may be partially or completely transitioned by a taper. The size of the outer diameter of the flush profile portion 280 corresponds with the flow rate of the flush or more specifically the flow rate while the flush profile portion 280 is positioned at the main valve seat and controlling fluid flow. The distance the flush profile portion 280 extends from the snubber portion 275 controls the flush timing, or more specifically the flush timing for the associated portion of the flush profile.

The plug portion 290 extends from the flush profile portion 280. The outer diameter of the flush profile portion 280 is less than that of the plug portion 290. In one embodiment the difference in outer diameter may be partially or completely transitioned by a taper. In one embodiment, the plug portion 290 includes contouring for a desired flush profile. The plug portion 290 imparts a "slow open" or "slow opening" to the flushometer system 10. The plug portion 290 hydraulically dampens the movement of the piston, essentially slowing down the opening of the main valve. In some embodiments the plug portion 290 provides for a reduced impact on the infrastructure of the system due to the slower open. Further, the slow opening allows the purging of air from within the valve at a lower GPM, thus allowing for a more efficient flush as high GPM is not used to move air.

The slow opening demonstrates a number of characteristics that distinguish from the "normal" opening for prior art valves. Slow opening-isolates the stroke variance of an actuation module 310, such as a relief valve 200. That is, the stroke or distance traveled by the relief valve stem 355 is not a controlling variable for the flush. Rather, the structure that enables a slow opening provides for insensitivity to stroke variance, and more tolerance of the venting method; (solenoid vs. manual) as the venting of relief chamber 201 becomes less critical because of the slow opening plug portion 290 (i.e. vent rate of the mechanism and causes thereof unlike existing art).

The slow opening reduces the acceleration of GPM during the initial stage of flush cycle (~$1^{st}$ few milliseconds) this feature extends this to a much longer time (~1 second) and through this feature can control the acceleration of GPM at this time of the flush cycle. The plug portion 290 has top surface that has a shape that controls the rate of change of the acceleration (rate of change) of GPM.

The O.D. of plug portion 290 and I.D. of main valve seat assembly 150 define an annulus allowing water flow through the valve when the plug portion 290 is fully engaged with the main valve seat assembly 150.

The flow control portion 270 may include one or more contours on the snubber portion 275, the flush control 280 or the plug portion 290, including at the transitions there between such as contour 291 in FIG. 6A.

The plug portion 290 may include one or more contours or grooves defining the outer perimeter. For example, a groove 292 in the plug portion 290 is configured to receive a plug portion seal (not show), which provides for reduction of "blow by" converging onto zero GPM by introducing the seal into groove 292 as to further reduce annulus and flow there through such as a full open condition (max GPM) of the valve. Thus, in one embodiment when the flushometer 10 is open and the piston assembly 210 is fully retracted from the main valve seat 152, the plug portion 290 may be positioned to restrict the flow of water through the flushometer 10. In the event that the valve fails or a user holds the activation mechanism and the flushometer 10 remains in an open position, the plug portion 290 reduces the flow rate of water dispensed from the flushometer 10, reducing wasted water and lessening the likelihood of an overflow from the urinal or toilet.

The plug portion 290 is positioned, when the valve is closed, within the main valve seat assembly. During a flush cycle, the plug portion 290 moves relative to the main valve seat 152. When the main valve seat seal 251 disengages from the main valve seat 152, water is able to flow over the main valve seat 152. As the plug portion 290 is still within the main valve seat assembly 150, the water must flow over and around the perimeter of the plug portion 290. As the plug portion 290 is present in the path the water would take through the main valve seat assembly 150, the volume of water per time unite (such as GPM) able to pass through the main valve seat assembly is reduced.

In one embodiment, the main valve seat retention mechanism 151 extends from the one or more main valve outlets 160, opposite the main valve seat 152. The valve seat receptacle 114 may be configured to receive the valve seat retention mechanism 151. In one embodiment, when the piston assembly 210 is in a closed position, the plug portion 290 of the flow control 270 is at least partially positioned within the retention mechanism 151 and the valve seat receptacle 114 of the valve body 110. In this resting or closed position, the flow control portion 270 is positioned adjacent the one or more main valve outlets 160, for example circumscribed by the one or more main valve outlets 160.

It should be appreciated the relative heights of the various portions of the flow control 270 can be adjusted and may, as a result, alter the positions relative to the parts of the main valve seat assembly 150 during the closed state.

Turning back to FIG. 5A, the piston assembly 210 and the sleeve 170 are engageable with a actuation module 310, with the actuation assembly and sleeve 170 defining a relief chamber 201 where the piston 220 is disposed. The actuation module 310 is actuated by an actuation mechanism 350.

Figure 7A:
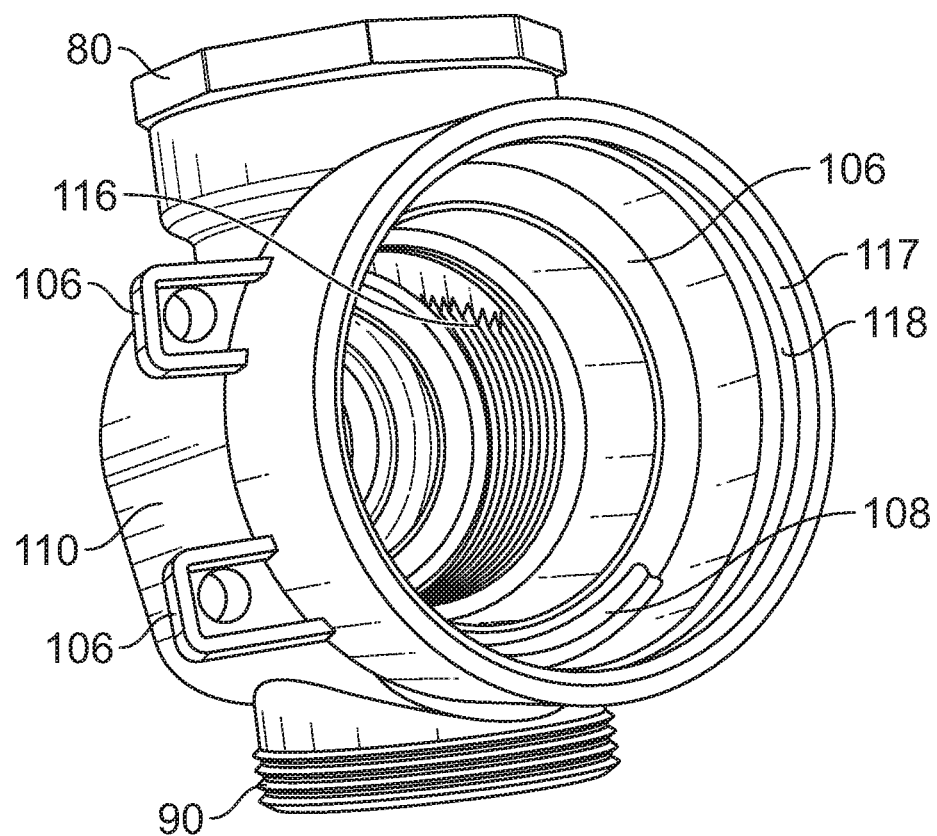
FIG. 7A illustrates one embodiment of a valve body in perspective.
Figure 7B:
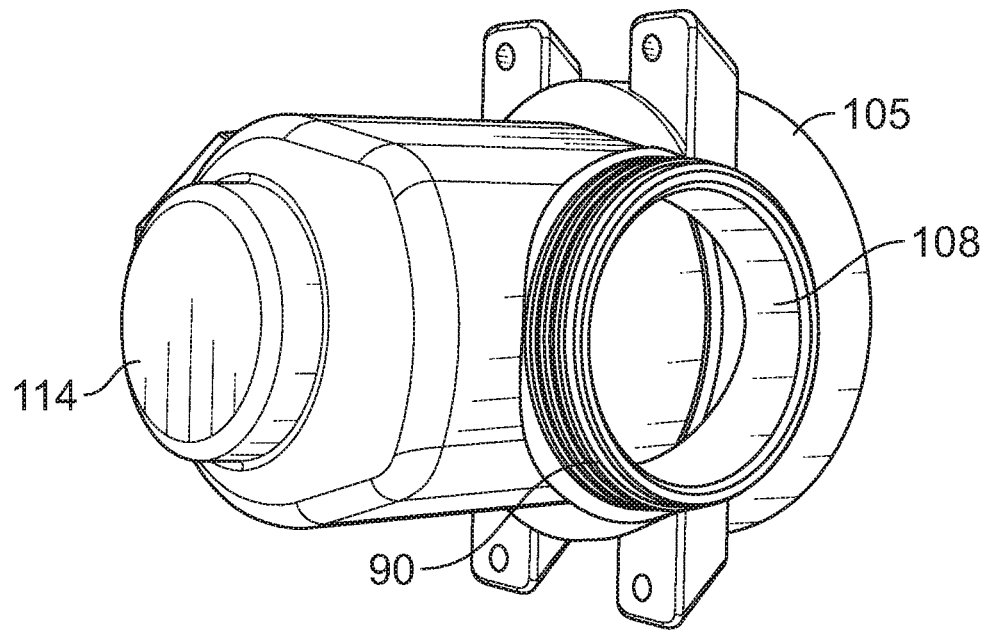
FIG. 7B is a back perspective view of one embodiment of a valve body.
Figure 7C:
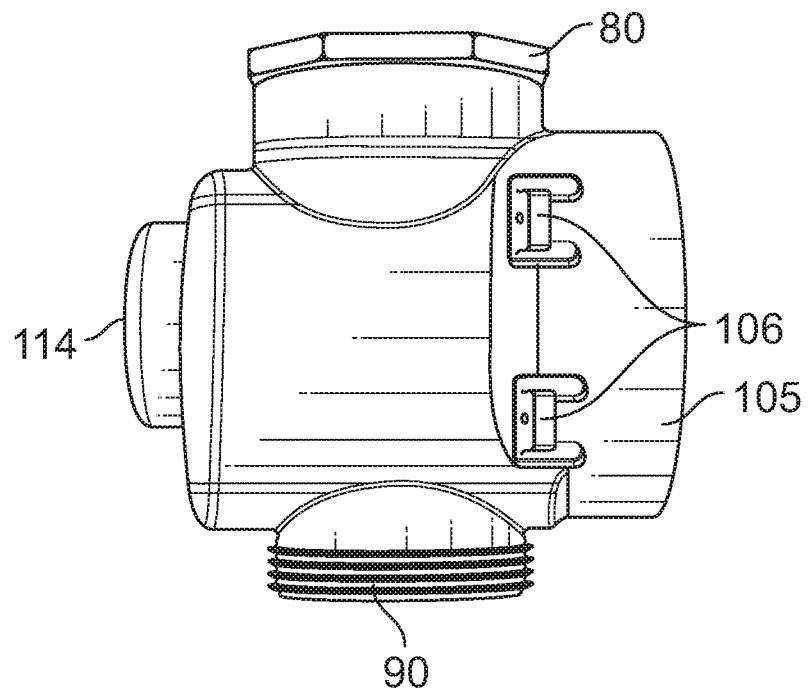
FIG. 7C is a side view of one embodiment of a valve body.

The actuation module 310, as shown in FIG. 1, is located distal to the main valve, i.e. on the opposite end of the piston assembly 210 as the main valve seat assembly 150 is engaged. The actuation opening 105 includes an increased diameter from the sleeve receptacle 116 portion of the valve chamber 112. The increased diameter of the valve body 110 from the sleeve receptacle 116 to the actuation opening 105 forms an activation opening shoulder 106 (in one embodiment, substantially parallel with the valve seat and substantially perpendicular to a longitudinal axis of the sleeve 170). Thus, as best shown in FIG. 7A-B, a venting chamber 115 (best shown in FIG. 1 and FIG. 5B) exists about the sleeve 170 at a sleeve activation end 174 (FIG. 5A), between the sleeve 170 and the valve body 110, further defined by the activation opening shoulder 106 and the actuation module 310 (described further below). This venting chamber 115 is in fluid communication with the outlet 90 through a venting journal 108 in the valve body 110. The venting journal 108 provides a passage from the venting chamber 115 to the outlet 90. FIG. 7A and FIG. 7B provide an illustration of the venting journal 108 without other components in installed.

In one embodiment, the sleeve 170 includes a plurality of splines 178 spaced about the external perimeter of an upper portion (adjacent the activation end) of the sleeve 170. FIG. 5A illustrates the plurality of splines 178 prior to engagement with a corresponding plurality of sprockets 324 in a bonnet 320 of the actuation module 310. Alternatively, the sleeve 170 and actuation module 310 may engage by tongue and groove, turn-and-lock, press-fit, or the like, so as to allow the actuation module 310 to be removed as further described below. Preferably, the actuation module 310 is coupled with the sleeve 170 such that rotation of the actuation module 310 rotates the sleeve 170. For example, rotation of the actuation module may cause the sleeve to interact with the retention mechanism to move the sleeve relative to the main valve seat assembly 150, closing the valve through action of the sleeve as a control stop.

As shown in FIGS. 5A-5E, an actuation module 310 includes a bonnet 320 with an activation module passage 312 and a sleeve cap 340. A relief valve stem 355 extends from a top of the bonnet 320 through the activation module passage 312 and, in one embodiment, through the sleeve cap 340. The relief valve stem 355 may include an upper stem seal 356 and a lower stem seal 357. The lower stem seal 357 may be retained between a lower stem cap 359, where the lower stem cap 359 has a larger outer diameter than that of the activation module passage 312. As seen in FIG. 5B, the lower stem cap 359 may aid to retain the stem within the passage 312 against a biasing mechanism 368 (also shown in FIG. 10A). At least one vent opening 314 in the activation module passage 312 above the sleeve cap 340 places the activation module passage 312 in fluid communication with an activation module exhaust chamber 370 defined between the bonnet 320 and the sleeve cap 340 and extending about the exterior of the sleeve 170 between the sleeve 170 and valve body 110 in communication with the venting journal 108. A flow portion 354 of the relief valve stem 355 allows for passage of water between the relief valve stem 355 in the activation module passage 312. The flow portion 354 does not fill the entire volume of the passage 312, for example because it has a (+) shaped cross section or the like rather than a circular or because the outer diameter of the flow portion 354 is less than half that of the inner diameter of the passage 312. The relief valve stem 355 is slidable relative to the activation module passage 312, allowing the lower stem seal 357 to be unseated and placing the relief chamber 201 in fluid communication with the activation module passage 312 and ultimately through the activation module passage 312 to the exhaust chamber 370 and through the venting journal 108 to the outlet, and, thus, the venting the relief chamber 201 to the outlet 90. The upper stem seal 356 is positioned such that it seals an upper portion of the activation module passage 312 above the vent opening 314. The relief valve stem 355 may include a head portion that acts as a control stop to limit the movement of the stem 355, such movement being limited such that the upper stem seal 356 does not enter the vent opening 314.

Figure 10A:
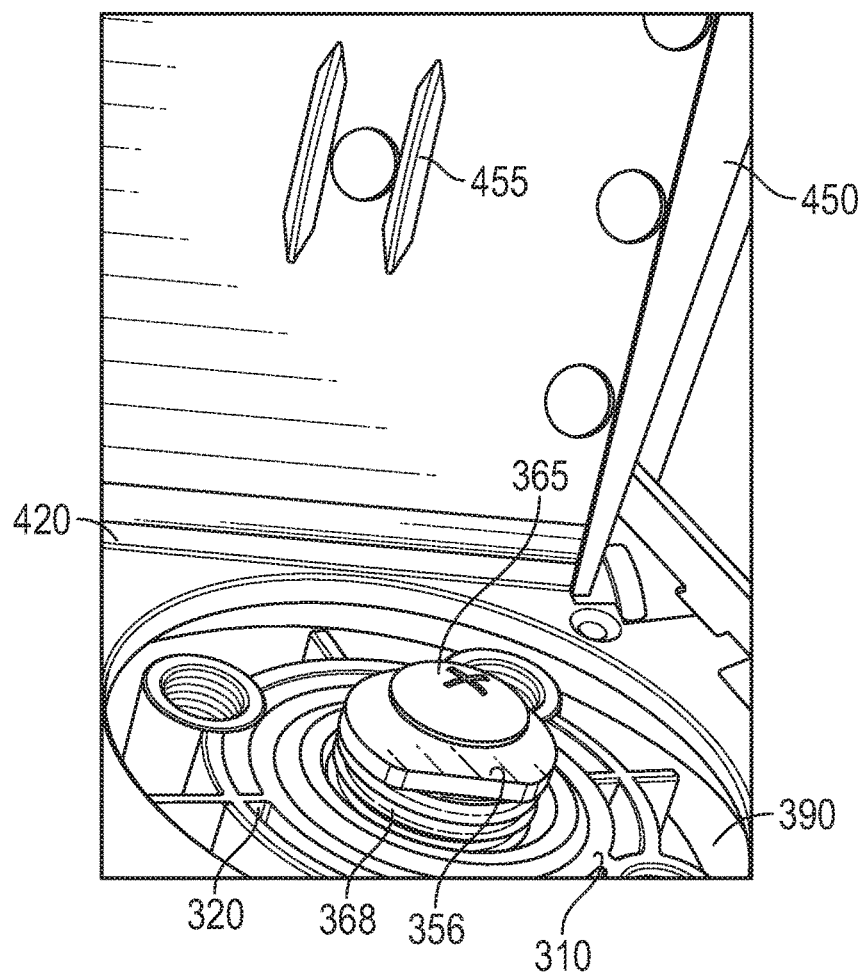
FIG. 10A shows a perspective, partial view of one embodiment of a flushometer system with a mounting plate and actuation mechanism secured in place and the face plate open.

As best shown in FIG. 10a, the actuation module 310 may include a biasing mechanism 368 such as a spring. The spring 368 may engage against a relief valve stem head 356, which is at an activation end of the relief valve stem 355 and includes a larger circumference portion against which the spring is retained between the relief valve stem head 356 and the bonnet 320.

With reference to 10A and 10B, an adjustment mechanism 365, such as an adjustment screw, nut, or the like, may be provided with the relief valve stem 355. The adjustment screw adjusts the relative position of the relief valve stem 355 and the face plate 450.

Figure 8A:
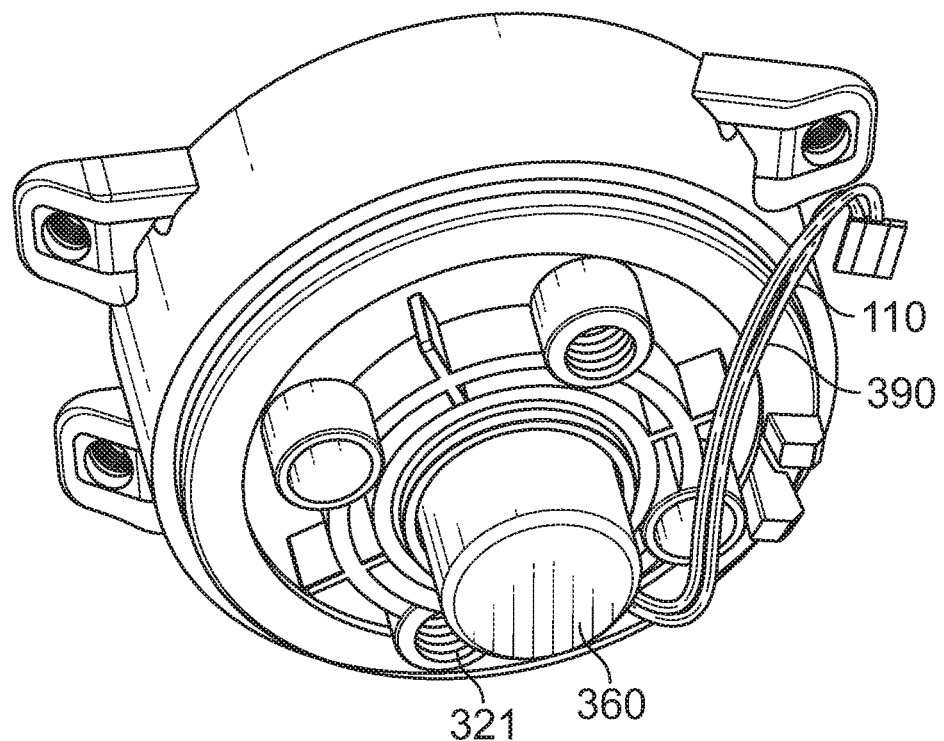
FIG. 8A is a perspective view of one embodiment of an automatic actuation module secured with a locking mechanism to an actuation opening of a valve body.
Figure 8B:
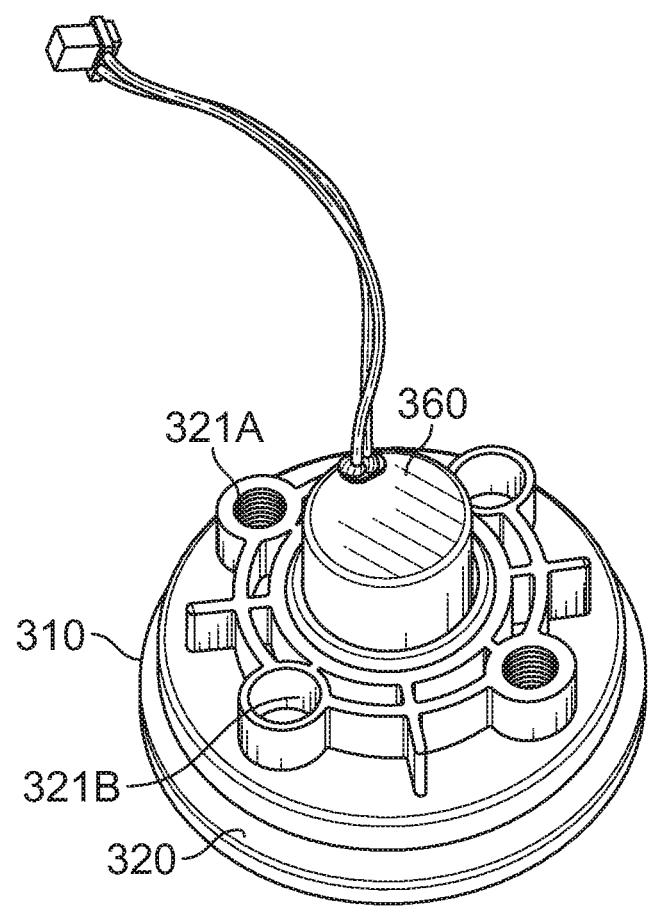
FIG. 8B is a perspective view of an automatic actuation module.
Figure 8C:
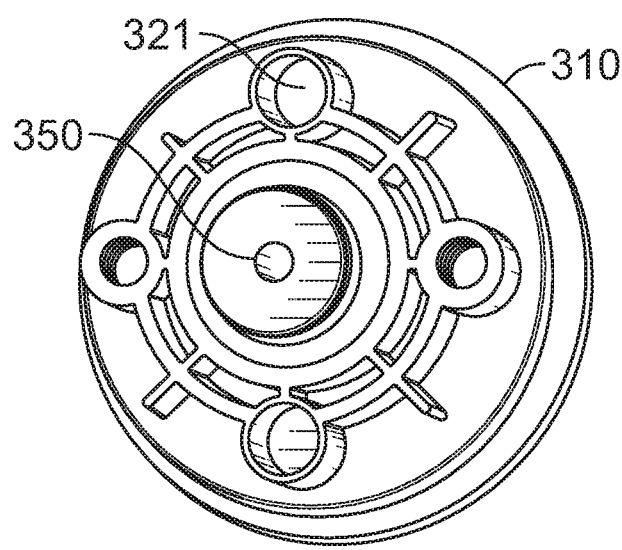
FIG. 8C is a perspective view of a manual actuation module.

As seen in FIGS. 8A-8C, the actuation mechanism 350 may be an automatic actuation mechanism 360 or a manual actuation mechanism 350. A manual actuation mechanism 350 may include a manual activation face plate 450, such as shown in FIG. 10A. An automatic actuation mechanism 360 may be a solenoid or the like, such as shown in FIG. 8A. The operation of the device using an automatic actuation mechanism 360 is generally the same as described below for a relief valve stem 355, except venting is accomplished without the mechanical relief valve stem 355. It should be appreciated that the automatic actuation mechanism 360 may be actuated by a sensor-controlled system "automatically", i.e., without user input, or by user actuation or by both.

It should also be appreciated that the actuation mechanism can other types of venting known in the art, including a hydraulic valve control. The hydraulic valve control may be as known in the art and the actuator for the hydraulic valve control may be mechanically separate from the valve 110 but in hydraulic communication.

As best shown in FIGS. 8B and 8C, the bonnet 320 may include one or more bosses 321 or protrusions for engaging with a removal tool 490 (embodiments shown in FIGS. 12 and 14) to adjust the position of the bonnet 320, such as to thread the sleeve 170 to contact the main valve seat 152. In one embodiment, a removal tool 490 may be used for engaging the bonnet 320 of the actuation module 310. The tool 490 is configured to have an engagement surface that mirrors the contours of the bonnet 320 to allow a user to rotate the bonnet by action of the tool. The tool 490 is also sized so as to fit within the face plate assembly opening.

Figure 12:
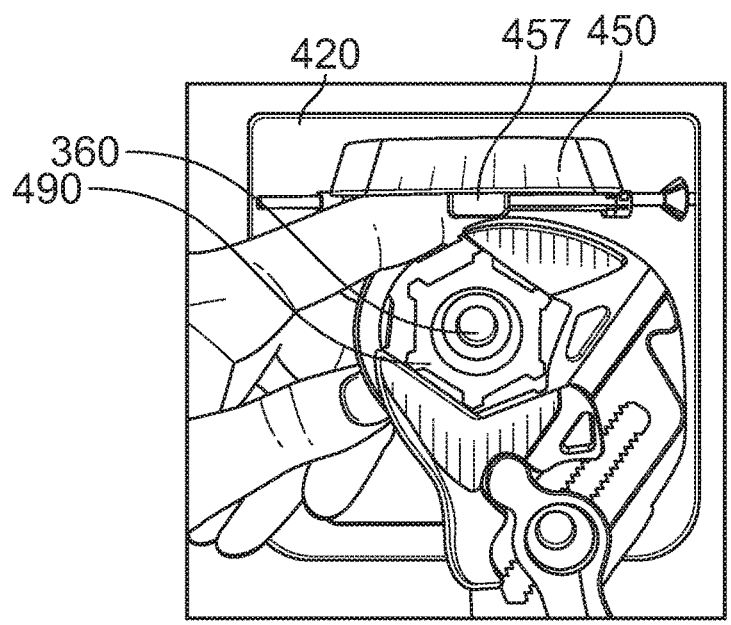
FIG. 12 illustrates the application of a tool to the actuation module bonnet to adjust the sleeve.

FIG. 12 illustrates one example of a removal tool in use. The one or more bosses 321 may also be threaded to allow for removal of the actuation module 310 by a tool (not shown).

The bonnet 320 may also include one or more air passages that may act as a vacuum breaker, such as check valves. The air passages provide additional air to the activation module exhaust chamber. The air passages may be, for example, included in the one or more bosses 321. In one embodiment, shown in FIG. 8B, as discussed above, at least one boss 321 is a tool receiving boss 321A, which includes a thicker wall and may be threaded to engage a pulling tool (not shown). Preferably, there are two tool receiving bosses 321A positioned opposite each other on the bonnet 320 to allow for engagement by a tool to impart a rotation and, for threaded boss embodiments, pulling action to the bonnet for removal. There may also be one or more vacuum breaker bosses 321B, which provide a vacuum breaker valve between the interior of the actuation module 310, including the exhaust chamber 370 and the external environment that is exposed beyond the bonnet (through the face plate assembly 410.

Figure 9:
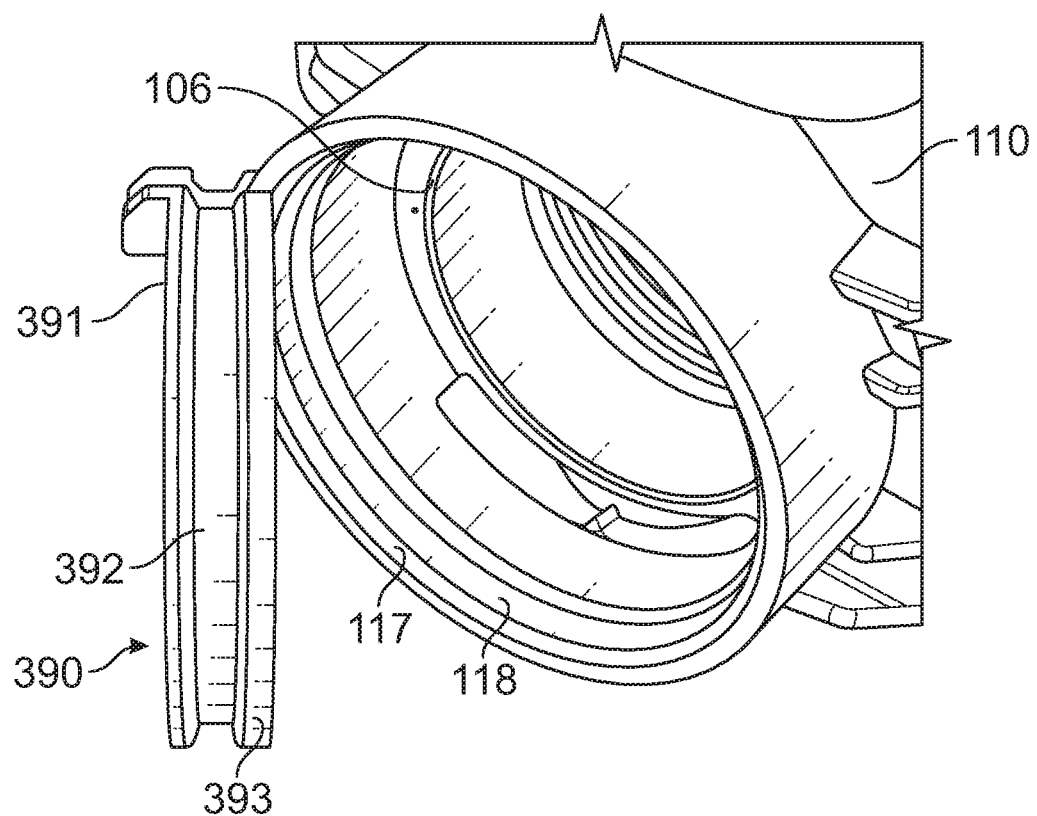
FIG. 9 is a perspective view of one embodiment of a locking mechanism and the actuation opening of a valve body.

With reference to FIG. 8A and FIG. 9, a locking mechanism 390 is further provided in one embodiment. The locking mechanism 390 removably retains the actuation module 310 within the actuation opening. In one embodiment, such as shown in FIG. 9, the locking mechanism 390 is a retaining ring, such as a "c" locking retaining ring where the ring has an opening or throat allowing the ring to expand or compress circumference slightly to lock or release, respectively. The retaining ring has an upper retaining ring ridge 391 and a lower retaining ring ridge 393 and a retaining ring groove 392 there between. The valve body 110 at the actuation opening 105 includes a shoulder 117 for engaging the groove 392. The shoulder 117 may be defined, such as shown in FIG. 7A, by a groove 118 in the valve body 110 at the actuation opening 105, such that the shoulder 117 has substantially the same inner diameter as the actuation opening 105 and the groove 118 has a larger inner diameter. Turning back to FIG. 8A and FIG. 9, the bonnet 320 includes a periphery having a diameter sized to allow the locking mechanism 390 to be disposed about it. The actuation module 310, piston assembly 210 and sleeve 170 may be threaded into the valve body 110 a distance to allow the locking mechanism 390 to be inserted or removed. In a preferred embodiment, the locking mechanism 390 is only removable (or insertable) when the sleeve 170 is engaged with the main valve seat 152, thus operating as a control stop and closing the valve, ensuring the actuation module 310 and piston assembly 210 can only be removed when the sleeve 170 is engaged as a control stop, i.e. the water from the inlet is shut off. When sleeve 170 is not positioned against the main valve seat 152, the actuation module 310, and sleeve 170 are separated from the main valve seat 152 and the bonnet 320 engages the locking mechanism 390 while the locking mechanism 390 also engages the valve body 110. The locking mechanism 390 retains the actuation module 310 from being removed while the locking mechanism 390 is in place relative to the valve body 110. It should be appreciated that the locking mechanism 390 may utilize a groove on the valve body that engages a protrusion of the locking mechanism or vice versa.

Figure 15:
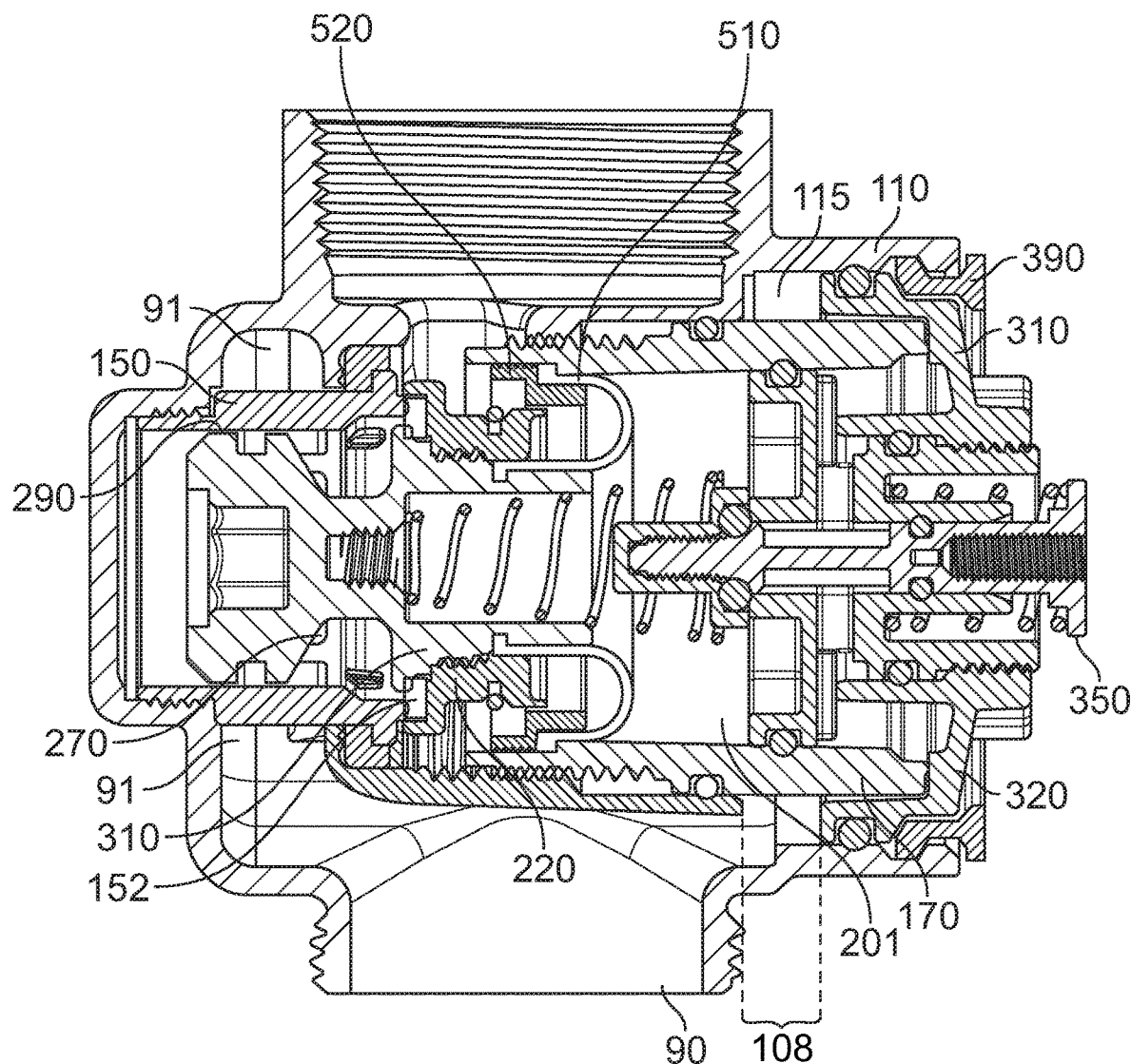
FIG. 15 illustrates an embodiment of a rolling diaphragm assembly with a plug for a slow start feature.

In an alternative embodiment, show in FIG. 15, the piston assembly 210 is replaced by a diaphragm assembly. The diaphragm assembly would utilize a diaphragm 510 with one or more bypasses (not show), to separate the relief valve chamber 201 from the valve chamber 112. The diaphragm 510 may be integral with the sleeve, or alternatively, captured between the sleeve and piston assembly 210. The piston 220 and flow control 270 would extend from the diaphragm 510 (which may be positioned adjacent and about the periphery of the piston 220, as shown in FIG. 15) towards the main valve seat assembly 150 as is described above for the piston valve. Further, alternative mechanisms such as a rolling diaphragm may be used. For use with a diaphragm assembly or a diaphragm-like assembly (as opposed to a solenoid or piston described above), the diaphragm 510 could be as known in the art with the diaphragm assembly. FIG. 15 illustrates an embodiment with a rolling diaphragm 510 held in place by one or more retaining nuts 520.

Figure 10B:
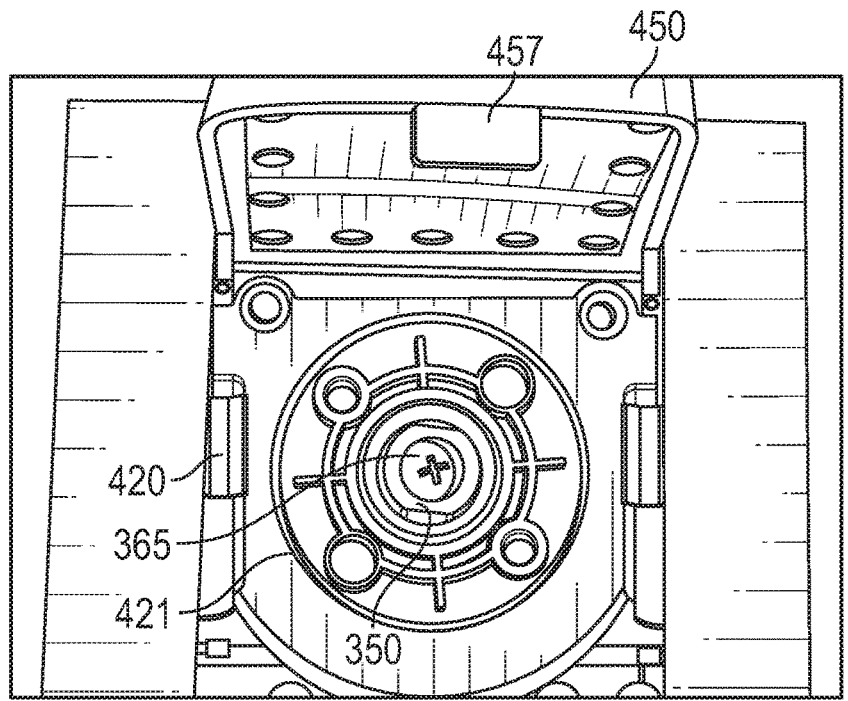
FIG. 10B is a front view of a flushometer system mounted behind a wall with the face plate exposed and open for accessing the actuation module.
Figure 13:
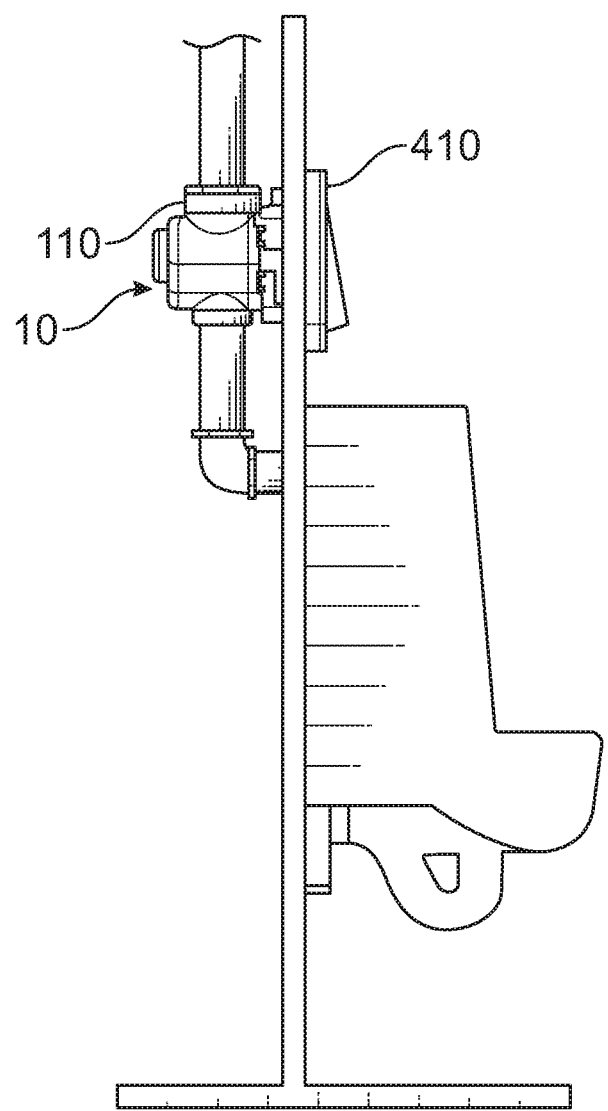
FIG. 13 illustrates a partial cut-away view of one embodiment of a flush system installed behind a wall for a urinal.
Figure 14:
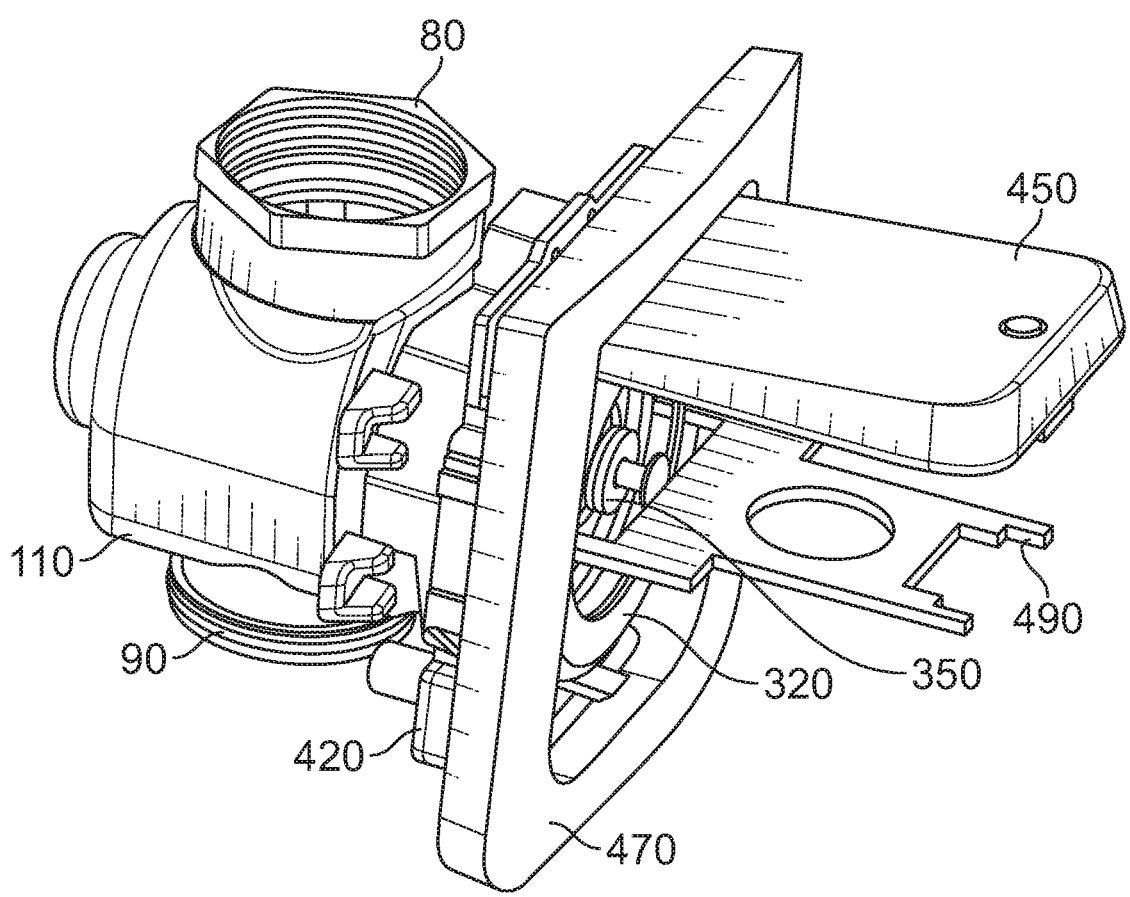
FIG. 14 illustrates one embodiment of a flush system with a tool for engaging the actuation module bonnet.

As shown in FIG. 13, with components best statically illustrated in FIGS. 10A-10B and FIG. 14, the manual actuation module 350 is actuated by a face plate assembly 410. The face plate assembly 410 may include a face plate 450 and a mounting ring 420. The mounting ring 420 is removably securable to the valve body 110. The face plate 450 is secured to the mounting ring 420. In one embodiment, the face plate 450 is pivotably mounted on the mounting ring 420 at a first end. The face plate 450 includes an actuation surface 455 that is configured to engage the actuation module 310 through a mounting ring opening 421. Specifically, the actuation surface 455 is engageable with the relief valve stem 355, such as the relief valve stem adjustment mechanism 365 to slide the relief valve stem 355 against the biasing mechanism 368, such as a spring, to cause a relief valve stem lower seal to unseal opening the pathway for water to exhaust from the relief chamber. In one embodiment, the actuation surface 455 is configured to interact with the relief valve stem 355 such that the movement of the face plate 450 as it pivots towards the valve body 110 is translated substantially into linear movement, sliding the relief valve stem 355. This may be accomplished by "rolling motion" to reduce wear.

In one embodiment, the face plate 450 is able to pivot away from the mounting ring 420 and valve body 110 to allow access to the actuation module 310 through the mounting ring 420 (and any exterior face plate cover 470). A face plate retainer 457 may be utilized to secure the face plate 450 from such movement away from the mounting ring 420, for example through the use of a pair of tabs. Thus, the face plate 450 is retained in a "down" position for engaging the relief valve stem 355. The face plate 450 may be pivoted away from the mounting ring 420 by releasing the face plate retainer 457. The face plate assembly 410 may further include an access mode retainer (not show), that retains the face plate in a position pivoted away (See FIG. 14) from the mounting ring 420. When in such a position, as shown in FIG. 14, the face plate 450 is retained so as to allow a user to access the bonnet 320 without need to hold the face plate 450 up. For example, the access mode retainer (not shown) may be a biasing spring, or one or more interacting tabs that interact with the mounting ring 420 and are positioned at an opposite end of the face plate 450 from the face plate retainer 457.

Figure 11:
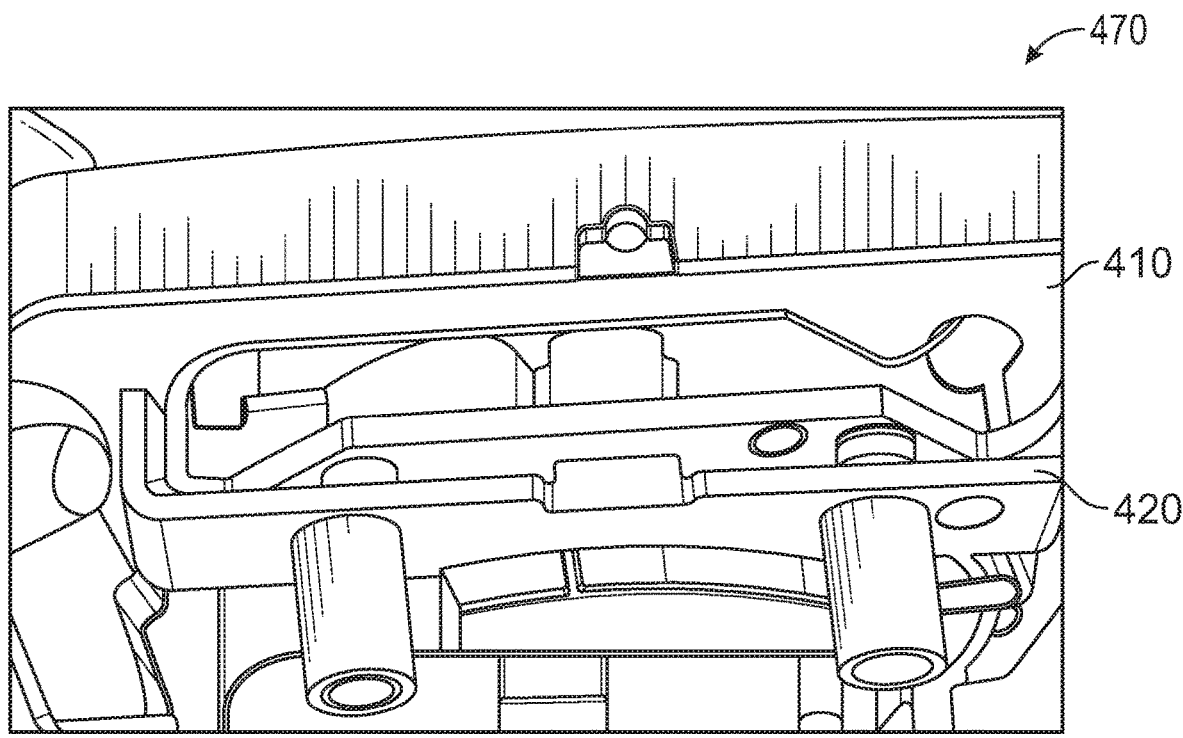
FIG. 11 illustrates a close-up partial view of a face plate exterior mounted to a mounting plate.

As best seen in FIGS. 11 and 14, in one embodiment, the face plate assembly 410 includes the mounting ring 420 and an exterior face plate cover 470. The face plate cover 470 may be retained to the mounting ring 420, but otherwise serves to cover the mounting ring 420 and present an appealing aesthetic to the user. In one embodiment the face plate cover 470 corresponds with a decorative tile, such as by having a similar size and shape, for example 4 inch square shape to match a standard 4 inch tile. The mounting ring 420 allows for, in one embodiment, a 5 degree rotational mismatch while still allowing the face plate cover 470 to be mounted squarely to the washroom wall trim.

The valve body 110 may include mounting brackets 106, such as shown best in FIG. 7A.

In some embodiments, the system described functions as follows. A user actuates the system by pressing the face plate 450, which pivots to engage the relief valve stem 355. The relief valve stem 355 slides within the actuation mechanism passage and the relief valve stem lower seal 357 unseats. This allows the hydraulic venting to begin. The opening of the relief valve 200 exposes the relief chamber 201 to the exhaust chamber 370 to the low pressure (typically atmospheric) on the outlet side of the flushometer 10. This creates an imbalance of pressures on the piston assembly 210, as the inlet-side pressure within the valve chamber 112 is higher (typically 10-100 PSI). This results in the piston 220 moving away from the main valve seat 152 as the valve chamber 112 enlarges and the relief chamber 201 shrinks. As the piston 220 is unseated from the main valve seat 152, water is able to flow over the main valve seat 152 from the inlet 80 and out through the one or more main valve outlets 160 to the outlet 90. The movement of the piston 220 also moves the attached flow control 270. For embodiments where the flow control includes a plug portion 290, the plug 290 restricts the flow of water (such as to about 5 gpm) until the plug portion 290 has withdrawn from the main valve seat assembly 150 and water is free to pass through the main valve seat assembly 150 without flowing over the plug 290. Thus, the initial phase of the flush cycle involves an immediate hydraulic venting but has a relatively low flow of water comparative to the maximum possible flow rate from the inlet 80. As the flush cycle begins to conclude and the actuation mechanism 250, such as relief valve 200, is closed, the bypasses allow for the pressure to begin to equilibrate by refilling the relief chamber 201 (no longer exposed to the outlet 90) with water from the valve chamber 112. The piston 220 begins to travel back towards the main valve seat 152 to reseat. As the plug 290 re-enters the main valve seat assembly 150, the flow rate is affected. Further, as the closing event approaches for the main valve seat assembly 150, the snubber portion 275 of the flow control 270 is disposed within the main valve inlet 157, the hydraulic interaction with the snubber 275 slows the closing of the flushometer 10.

The system, in some embodiments, allows for water delivery limits within 10-100 PSI.

For embodiments utilizing a manual activation face plate, in one application the manual activation requires no more than five pounds of force to engage the activation module triggering a flush cycle to start.

In one embodiment, the valve provides a flush cycle having a flush profile. The flush profile corresponds to the flow rate (typically expressed as gallons per minute) at a given time and the time elapsed since the flush cycle was initiated. The relative height of flow control 270 controls the flush time while the relative outer circumference of the flow control 270 controls the flow rate. It should be appreciated the individual components of the flow control can have their height and/or outer circumference varied to achieve a desired flush profile.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A flushometer system comprising:
   a valve body having an inlet, an outlet, and an actuation opening, the inlet and outlet having a vertical axis running therethrough and the actuation opening being perpendicular to the vertical axis and defining a horizontal axis;
   a valve seat assembly disposed in the valve body between the inlet and the outlet;
   a sleeve adjustably engageable with the valve body, the sleeve movable relative to the valve body to be engaged and disengaged from the valve seat assembly;
   a piston assembly slidably disposed within the sleeve;

an actuation module removably engageable with the sleeve, a relief chamber is defined within the sleeve between the actuation module and the piston assembly, the actuation module configured to vent the relief chamber upon actuation;

the piston assembly including a piston having a lip seal portion, a middle portion having a reduced diameter relative to the lip seal portion, and a main valve seal portion.

2. The flushometer system of claim 1, wherein the actuation module includes a plurality of bosses.

3. The flushometer system of claim 2, wherein the plurality of bosses include at least one vacuum breaker boss and at least one tool receiving boss.

4. The flushometer system of claim 1, wherein the valve body includes an inlet aperture adjacent the valve seat assembly and a venting journal adjacent to the sleeve and the outlet.

5. The flushometer system of claim 1, wherein the valve seat assembly comprises a valve inlet and a plurality of valve outlets.

6. The flushometer system of claim 5, wherein the valve seat assembly has a cylindrical shape with the valve inlet on a first planar face and the plurality of valve outlets disposed about a curved surface.

7. The flushometer system of claim 1, where a valve chamber is defined between the inlet, outlet, and actuation opening.

8. The flushometer system of claim 7, wherein the valve chamber includes a valve seat receptacle engageable with the valve seat assembly and positioned opposite the actuation opening.

9. The flushometer system of claim 1, further comprising a flow control extending from the piston assembly, the flow control comprising a snubber portion, a flush profile portion, and a plug portion.

10. The flushometer system of claim 9 wherein an outer diameter of the snubber portion is greater than an inner diameter of a valve inlet of the valve seat assembly, an outer diameter of the plug portion is less than the inner diameter of the valve inlet and an outer diameter of the flush profile portion is less than the outer diameter of the plug portion.

11. The flushometer system of claim 1, wherein the actuation module includes a solenoid.

12. A flushometer control apparatus comprising
a sleeve;
a piston assembly slidably disposed within the sleeve;
an actuation module removably engageable with the sleeve, a relief chamber is defined within the sleeve between the actuation module and the piston assembly, the actuation module configured to vent the relief chamber upon actuation;

the piston assembly including a piston having a lip seal portion engageable with the sleeve, a middle portion having a reduced diameter relative to the lip seal portion, and a main valve seal portion;

the actuation module engageable with a relief valve associated with the relief chamber, wherein actuation of the actuation module vents the relief chamber.

13. The flushometer control apparatus of claim 12, wherein the actuation module includes a plurality of bosses.

14. The flushometer control apparatus of claim 13, wherein the plurality of bosses include at least one vacuum breaker boss and at least one tool receiving boss.

15. The flushometer control apparatus of claim 12, further comprising a face plate assembly having a face plate push button and a mounting ring, wherein the face plate push button is configured to engage the actuation module, wherein the mounting ring further includes a mounting ring opening through which a face plate is engageable with the relief valve.

16. The flushometer control apparatus of claim 15, wherein the face plate is pivotally mounted with regard to the mounting ring such that the face plate pivots about a hinge.

17. The flushometer control apparatus of claim 15, wherein the actuation module includes a bonnet, engageable with the sleeve, and a piston assembly slidably disposed within the sleeve and defining an upper chamber between the bonnet and the piston assembly.

18. The flushometer control apparatus of claim 17, wherein the piston assembly further includes a flow control portion affixed at an end opposite of the upper chamber.

19. The flushometer control apparatus of claim 18, wherein the actuation module includes an activation module passage through the bonnet and a relief valve stem slidably positioned in the activation module passage with a lower stem cap.

20. The flushometer control apparatus of claim 19, wherein the relief valve stem has a flow portion that is slidably engageable with a vent opening in the activation module passage.

* * * * *